US009100822B2

(12) United States Patent
Doss et al.

(10) Patent No.: US 9,100,822 B2
(45) Date of Patent: Aug. 4, 2015

(54) SYSTEM AND METHOD FOR INFORMATION SHARING USING VISUAL TAGS

(75) Inventors: Stephen Scott Doss, San Carlos, CA (US); Richard Graham Cook, San Jose, CA (US); Daniel Ernesto Barreto, Los Altos, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 386 days.

(21) Appl. No.: 13/405,223

(22) Filed: Feb. 24, 2012

(65) Prior Publication Data
US 2013/0221083 A1    Aug. 29, 2013

(51) Int. Cl.
*G06F 17/00* (2006.01)
*H04W 12/04* (2009.01)

(52) U.S. Cl.
CPC .................................... *H04W 12/04* (2013.01)

(58) Field of Classification Search
USPC ............. 235/375, 382, 382.5, 462.45, 472.01
See application file for complete search history.

(56) References Cited

U.S. PATENT DOCUMENTS

| | | | |
|---|---|---|---|
| 2005/0199699 A1* | 9/2005 | Sato et al. | 235/375 |
| 2006/0002610 A1 | 1/2006 | Suomela et al. | |
| 2007/0019616 A1* | 1/2007 | Rantapuska et al. | 370/352 |
| 2011/0302297 A1 | 12/2011 | Kruglick | |
| 2011/0314153 A1 | 12/2011 | Bathiche et al. | |
| 2012/0198531 A1 | 8/2012 | Ort et al. | |

FOREIGN PATENT DOCUMENTS

EP    2166697    3/2010    ............... H04L 9/32

OTHER PUBLICATIONS

"Near field communication", Wikipedia—The Free Encyclopedia, last modified on Jun. 5, 2012, retrieved from <http://en.wikipedia.org/wiki/Near_field_communication>.
"QR Code", Wikipedia—The Free Encyclopedia, last modified on Jun. 2, 2012, retrieved from <http://en.wikipedia.org/wiki/QR_code>.
International Search Report and Written Opinion; PCT/US2013/027433; pp. 14, Jul. 10, 2013.
International Search Report and Written Opinion; PCT/US2013/027442; pp. 13, Jul. 10, 2013.
International Search Report and Written Opinion; PCT/US2013/027371; pp. 14, Jul. 10, 2013.
International Search Report and Written Opinion; PCT/US2013/027407; pp. 13, Jul. 10, 2013.
International Preliminary Report on Patentability; PCT/US2013/027433; pp. 11, Sep. 4, 2014.
International Preliminary Report on Patentability; PCT/US2013/027442; pp. 9, Sep. 4, 2014.

(Continued)

*Primary Examiner* — Daniel St. Cyr
(74) *Attorney, Agent, or Firm* — Baker Botts L.L.P.

(57) ABSTRACT

Source data stored on a source device may be shared with other devices. Sharing the source data may include facilitating communication associated with the source data, based on a communication protocol, between a first device and another device. Receiving a first token associated with the source data may be facilitated. The first token may be encoded to generate a visual tag. An image of the visual tag may be provided to enable a second device to capture the image, retrieve the first token after decoding the visual tag, and use the first token to access the source data utilizing a communication protocol.

44 Claims, 18 Drawing Sheets

(56) References Cited

OTHER PUBLICATIONS

International Preliminary Report on Patentability; PCT/US2013/027407; pp. 10, Sep. 4, 2014.
International Preliminary Report on Patentability; PCT/US2013/027371; pp. 11, Sep. 4, 2014.
United States Office Action; U.S. Appl. No. 13/405,220; pp. 30, Apr. 11, 2014.
United States Office Action; U.S. Appl. No. 13/405,222; pp. 26, Jun. 23, 2014.
United States Office Action; U.S. Appl. No. 13/405,224; pp. 16, Oct. 29, 2013.
United States Final Office Action; U.S. Appl. No. 13/405,224; pp. 13, Apr. 9, 2014.

* cited by examiner

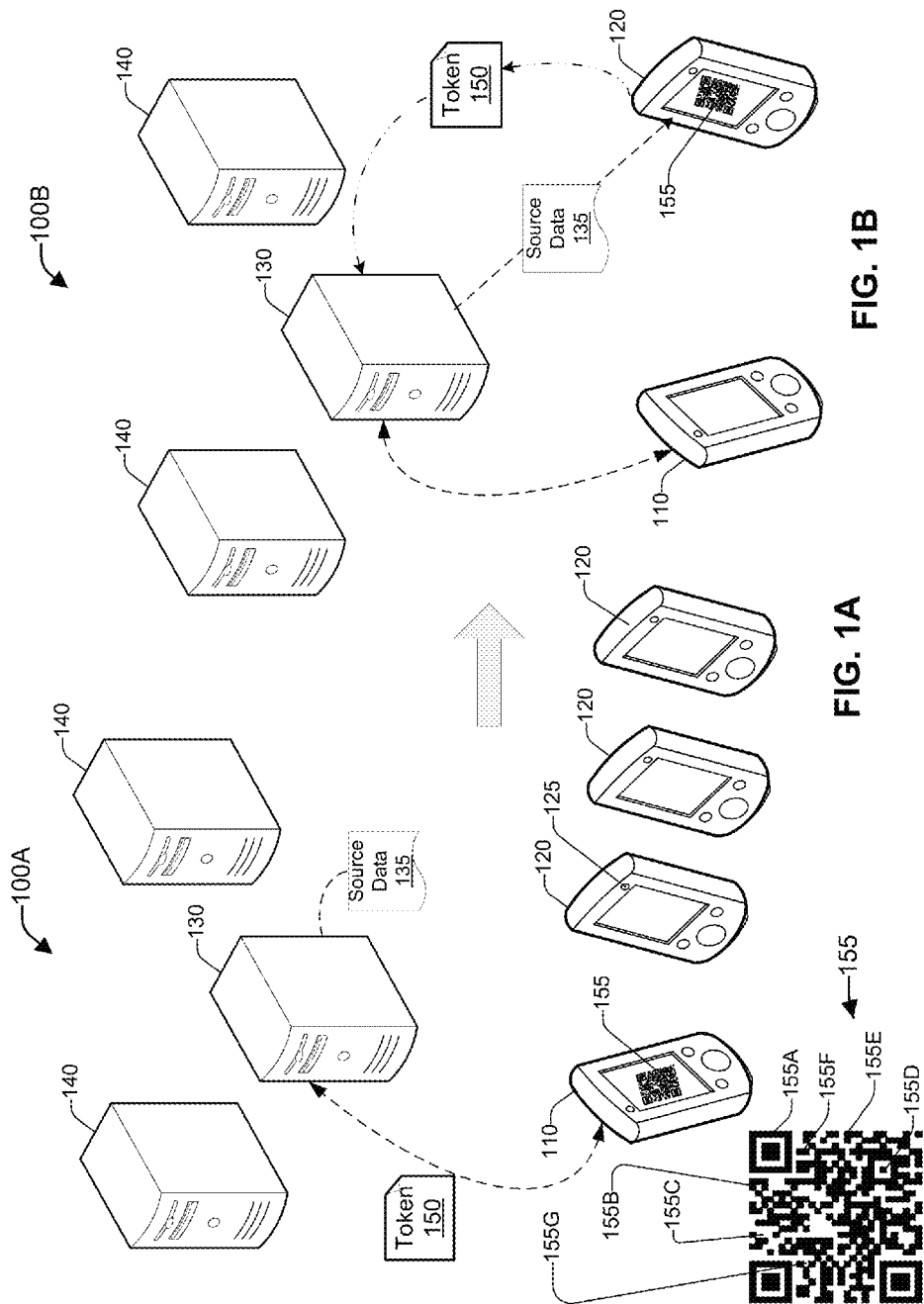

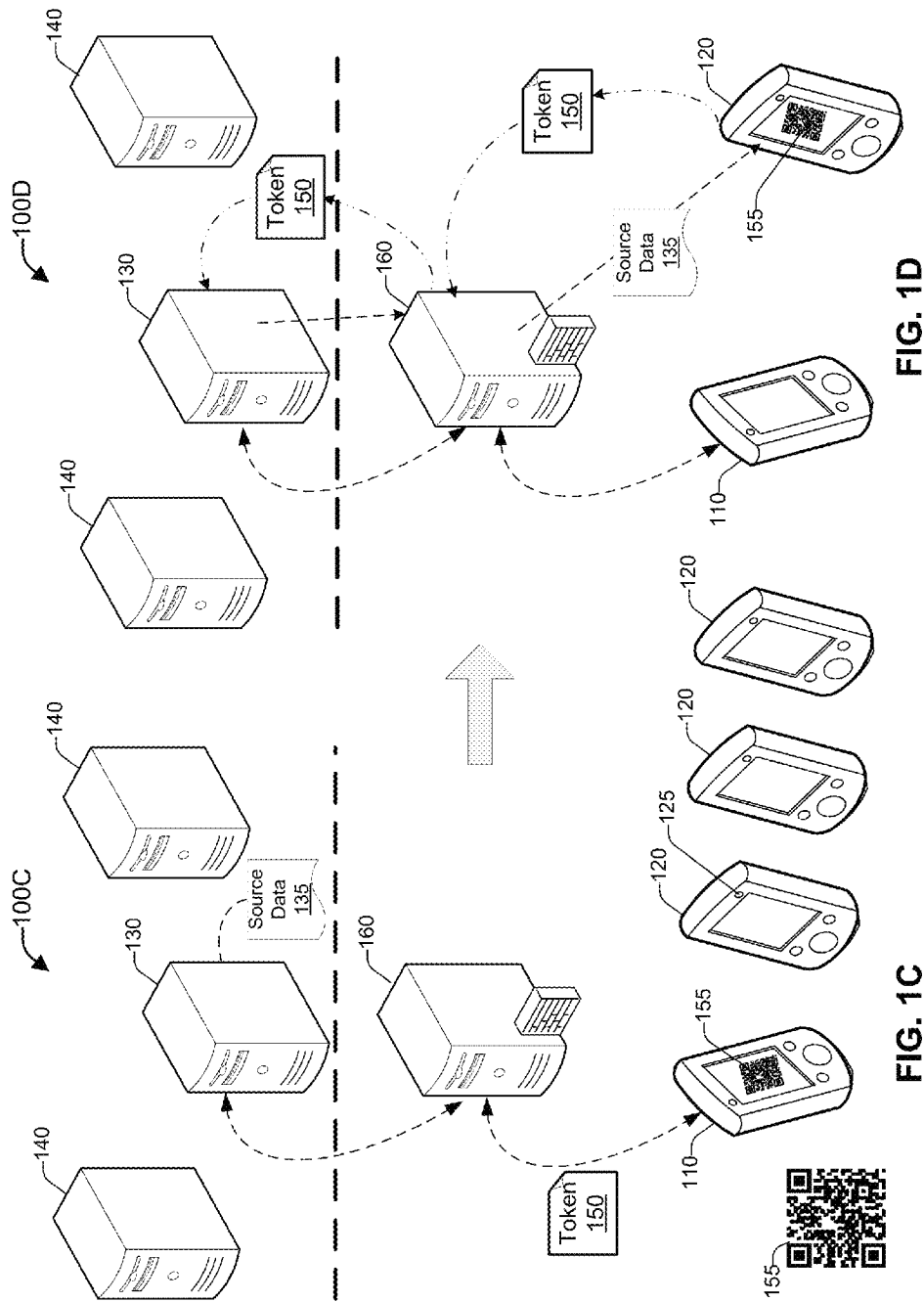

SYSTEM AND METHOD FOR INFORMATION SHARING USING VISUAL TAGS

FIELD

The subject technology relates in general to information sharing, and more particularly to information sharing using visual tags.

BACKGROUND

With the advancement of network technologies and rapid development of many social networks (e.g., Facebook, LinkedIn, MySpace, Twitter, Google+, etc.), people may share information in a verity of methods. For example, via email, one can attach files intended to be shared including a host of documents and media files (e.g., image files, audio files, video files, etc.) to an email message or provide links to the online sources of information by including one or more uniform resource locator (URLs) that point to the online sources. Sharing information via social networks is also very popular and effective for a number of purposes, for example, people may readily share various media files and even have their peers informed about their whereabouts and kind of activities they are enjoying.

Using mobile phones, money can be transferred from one account to another account. Mobile phones can also be used as credit card readers for transferring money from a credit card account of a credit card holder to an account associated with another person. A credit card holder may also setup a mobile phone to store the credit card information and use the mobile phone, instead of the credit card to perform transactions with a machine such as an automated teller machine (ATM). Various mobile phone applications may facilitate scanning products' barcodes on mobile phones and retrieve product information, such as product labels, stored on the barcodes.

SUMMARY

In an aspect of the disclosure, a non-transitory machine-readable medium may comprise instructions stored therein and executable by one or more processors to facilitate performing a method for facilitating sharing source data. The method may comprise supporting communication based on a first communication protocol between a first device and a remote device. The communication may be associated with source data. Receiving a first token associated with the source data. Encoding the first token to create a visual tag may be facilitated. Displaying the visual tag, to enable a second device to optically capture the visual tag utilizing a camera may be provided. The visual tag may allow the second device to access the source data utilizing the first token from the visual tag and utilizing a second communication protocol. The second device may be unable to access the source data without using the first token. The first communication protocol may be the same or different from the second communication protocol, and the first device may be a communication end point device.

In another aspect of the disclosure, a non-transitory machine-readable medium comprising instructions stored therein and executable by one or more processors to facilitate performing a method for facilitating sharing source data. The method may comprise facilitating receiving a first token associated with the source data. Encoding the first token to create a visual tag may be facilitated. Communication of the visual tag from a first device to a second device may be provided to enable the second device to access the source data utilizing the first token from the visual tag and utilizing a communication protocol. The second device may be unable to access the source data without using the first token.

In yet another aspect of the disclosure, an apparatus for facilitating sharing source data may comprise a first network interface configured to support communication based on a first communication protocol between the apparatus and a remote device. An encoder may be configured to facilitate receiving a first token associated with source data. The encoder may be configured to facilitate encoding the first token using a visual coding technique to generate a visual tag. A display may be configured to facilitate display of an image of the visual tag, to enable a first device located within close proximity of the apparatus to capture the image and to enable the first device to access the source data utilizing the first token from the visual tag and utilizing a second communication protocol. The first device may be unable to access the source data without using the first token. The first communication protocol may be the same or different from the second communication protocol, and the apparatus may be a communication end-point device.

In yet another aspect of the disclosure, an apparatus for facilitating sharing source data may comprise a processor operable to facilitate receiving a first token associated with the source data. The processor may be operable to facilitate encoding the first token to create a visual tag. The processor may be operable to provide for communication from a first device to a second device the visual tag, to enable the second device to access the source data utilizing the first token from the visual tag and utilizing a communication protocol. The second device may be unable to access the source data without using the first token, and the first device comprises the apparatus.

In yet another aspect of the disclosure, a method for facilitating sharing source data may comprise supporting communication based on a first communication protocol between a first device and a third device. The communication may be associated with source data. Receiving a first token associated with the source data may be facilitated. Encoding the first token to create a visual tag may be facilitated. Displaying the visual tag may be provided to enable a second device to optically capture the visual tag utilizing a camera and to allow the second device to access the source data utilizing the first token from the visual tag and utilizing a second communication protocol. The second device may be unable to access the source data without using the first token. The first communication protocol may be the same or different from the second communication protocol, and the first device may be a communication end point device.

In yet another aspect of the disclosure, a method for facilitating sharing source data may comprise facilitating receiving a first token associated with the source data. Encoding the first token to create a visual tag may be facilitated. Communication of the visual tag from a first device to a second device may be provided to enable the second device to access the source data utilizing the first token from the visual tag and utilizing a communication protocol. The second device may be unable to access the source data without using the first token.

In yet another aspect of the disclosure, a non-transitory machine-readable medium comprising instructions stored therein and executable by one or more processors to facilitate performing a method for facilitating sharing source data. The method may comprise facilitating optically capturing, by an optical device of a first device, an image of a visual tag from a second device. The visual tag of the second device may be located within close proximity of the optical device of the first device, and the visual tag may comprise a visually encoded first token associated with the source data. The first token may be a non-public token, and may be based on the source data for sharing. Decoding the visual tag to retrieve the first token may be facilitated. Communication based on a first communication protocol to a third device may be provided to download the source data using the retrieved first token. The second device may be adapted to provide display of the visual tag.

In yet another aspect of the disclosure, a non-transitory machine-readable medium comprising instructions stored therein and executable by one or more processors to facilitate performing a method for facilitating sharing source data. The method may comprise facilitating obtaining an image of a visual tag from a first device, wherein the visual tag comprises a visually encoded first token associated with the source data. The first token may be a non-public token. Decoding the visual tag to retrieve the first token may be facilitated. Communication based on a first communication protocol to a second device may be provided to download the source data using the retrieved first token.

In yet another aspect of the disclosure, an apparatus for facilitating sharing source data may comprise a camera configured to facilitate capturing an image of a visual tag representing a first token associated with the source data from a display of a first device, located within close proximity of the camera. The first token may be a non-public token, and may be based on the source data for sharing. A decoder may be configured to facilitate decoding the visual tag to retrieve the first token. A network interface may be configured to provide for communication based on a first communication protocol to a remote device to download the source data using the retrieved first token. The display of the first device may be enabled to display the image of the visual tag to be captured by the camera.

In yet another aspect of the disclosure, an apparatus for facilitating sharing source data may comprise a processor operable to facilitate obtaining an image of a visual tag from a first device. The visual tag may comprise a visually encoded first token associated with the source data, and the first token may be a non-public token. The processor may be operable to facilitate decoding the visual tag to retrieve the first token. The processor may be operable to provide for communication based on a first communication protocol to a second device to download the source data using the retrieved first token.

In yet another aspect of the disclosure, a method for facilitating sharing source data may comprise facilitating optically capturing, by an optical device of a first device, an image of a visual tag from a second device. The visual tag of the second device may be located within close proximity of the optical device of the first device. The visual tag may comprise a visually encoded first token associated with the source data, and the first token may be a non-public token. The first token may be based on the source data for sharing. Decoding the visual tag may be provided to retrieve the first token. Communication based on a first communication protocol to a third device may be provided to download the source data using the retrieved first token. The second device may be adapted to provide display of the visual tag.

In yet another aspect of the disclosure, a method for facilitating sharing source data may comprise facilitating obtaining an image of a visual tag from a first device. The visual tag may comprise a visually encoded first token associated with the source data, and the first token may be a non-public token. Decoding the visual tag to retrieve the first token may be facilitated. Communication based on a first communication protocol to a second device may be provided to download the source data using the retrieved first token.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

FIGS. 1A-1D are conceptual block diagrams of examples of systems for sharing information using a visual tag.

DETAILED DESCRIPTION

Figures 2A, 2B:
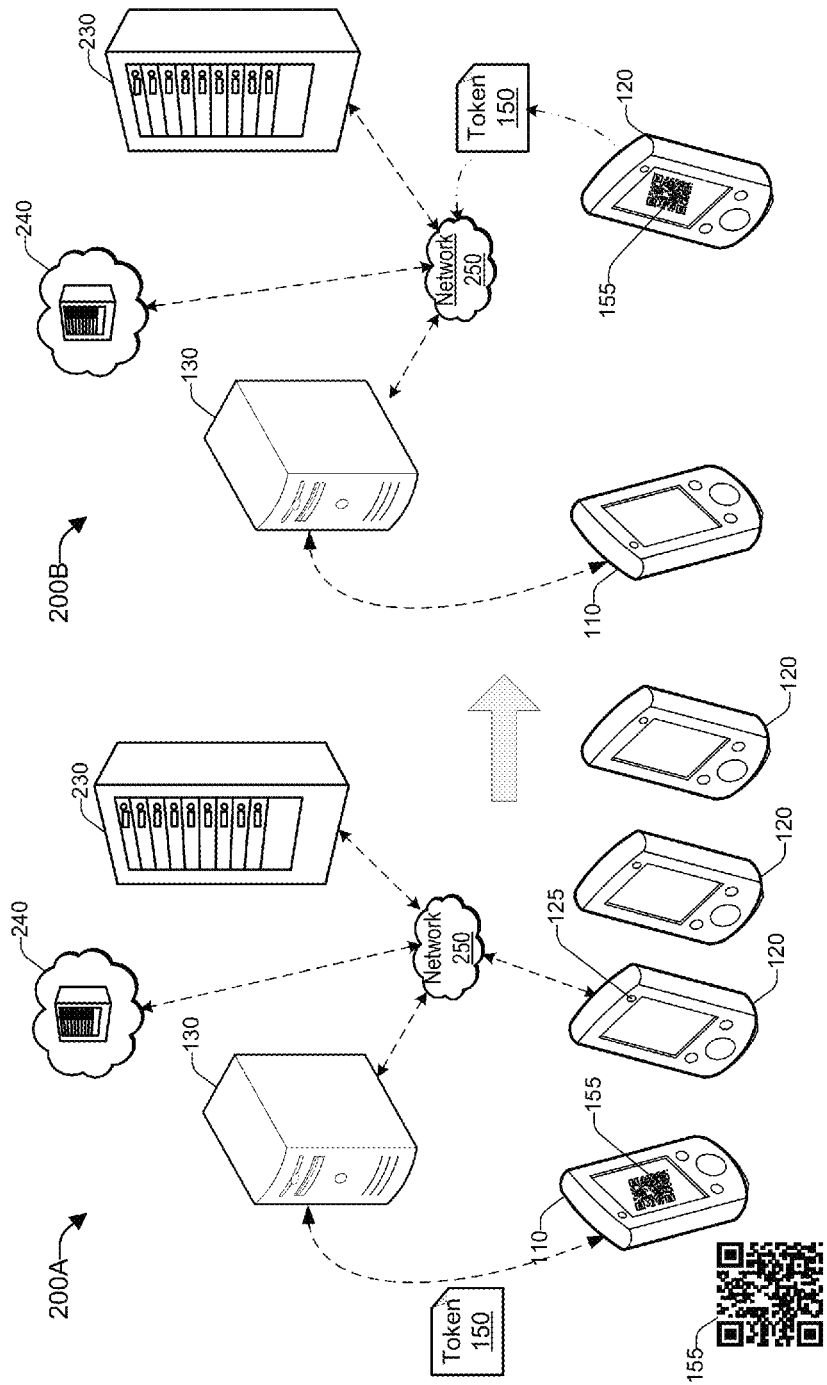
FIGS. 2A-2C are conceptual block diagrams of examples of systems for sharing information using the visual tag.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Often information is shared between devices using email or one or more social networks. Certain information may be transferred to multiple devices using visual encoding. For example, product barcodes (e.g., universal product codes (UPCs)) may be scanned by a handheld device having a barcode scanner application, which may retrieve bar code information such as product label. Two-dimensional or matrix barcodes (e.g., quick response (QR) codes) may provide fast readability and larger storage capacity, as compared to UPC barcodes. QR code is, however, still limited in storage. For instance, QR code is generally limited to certain applications such as product labels, commercial tracking information, transport and entertainment ticketing information, and the like, where the size of the information encoded is limited and depends on the type of data encoded.

In an aspect of the subject technology, a source data intended to be shared between the first and the second devices may be stored on a remote device and have a desired size not limited by visual encoding. The type of the source data is also not limited by visual encoding. For example, the source data may comprise data files including media data, connection settings information, device management information, device configuration information and so forth, which can be downloaded by the second device from the remote device by using a token communicated from the first device to the second device using a visually encoded tag (e.g., visual payload). The visual tag may be generated using any visual coding techniques such as QR, but not limited to QR. The visual tag may be visually captured (e.g., scanned/photographed) via a camera of the second device (e.g., a built-in camera) and decoded at the second device to retrieve the token that enables the second device to access the source data, which the second data could not access without the information provided by the token. The information transfer in the subject technology benefits from the security of the image transfer (e.g., scanning) via a camera, which is not susceptible to common security threats that other modes of communication such as wireless communication between two devices may be vulnerable to. The subject technology may also lower the threshold of required device hardware/technologies to facilitate information exchange. In one aspect, a camera may be an optical device. In one aspect, a camera may be an optical scanner. A scanner may use a laser. A camera may optically (or visually) capture a visual tag as an image.

FIGS. 1A-1D are conceptual block diagrams of examples of systems for sharing information using a visual tag. Systems 100A-100B include a first device 110 (hereinafter "device 110") one or more second devices 120 (herein after "device 120"), and one or more remote devices 130 and 140. Device 110 and device 120 may comprise handheld devices (e.g., mobile phones, personal data assistants (PDAs), tablet computers, laptop computers, etc.). Remote devices 130 and 140 may comprise servers including cloud servers, desktop computers, or portable devices such as laptop computers, tablets, personal data assistants (PDAs), mobile phones, and the like. In an aspect, a "remote" device, or a device "remote" to a system or another device, may be a device that is not directly connected to the system or the other device. For example, the remote devices 130 and 140 are remote to both device 110 and device 120, because remote devices 130 and 140 are not directly connected to device 110 and device 120, but may be connected indirectly through a network which can include, for example, another server, or the Internet. In particular, device 120 may not have authorized access to remote devices 130 and 140.

A user of device 110 may decide to share, with device 120 or other devices, a source data 135 stored in a source device. In one aspect, a source device may be a remote device such as one or more remote devices 130 and 140, or one or more other remote devices. In another aspect, a source device may be a local device such as device 110 or another local device.

In a scenario that source device is a remote device, once the user of device 110 decides to share the source data 135 stored in the source device with device 120, device 110 may request and obtain information (e.g., metadata) associated with accessing the source data 135 by device 120 (e.g., a token 150) from the remote device. Device 110 may encode token 150 to generate a visual tag 155, which can be made available to device 120 by displaying it on device 110 or by communicating the visual tag 155 to device 120 (e.g., via email, multimedia messaging service (MMS), peer-to-peer (P2P) communication, or Bluetooth (BT) communication, etc.). Device 120 may scan tag 155 from the display of device 110 or receive it from device 110 via a communication method such as one of the above-mentioned communication methods or another method, and decode the captured visual tag 155 to retrieve token 150, which enables device 120 to attain authorized access to remote device 130 and download source data 135 (see FIG. 1B).

In a case where a visual tag of a token 150 is transferred to device 120 by making the visual tag visible to device 120, once token 150 is captured by device 120, device 110 and device 120 are no longer required to be in close proximity, and devices 110 and 120 can be moved away from each other, and device 120 can still obtain/download the source data using one or more of the various communication protocols described herein.

In a case where a visual tag of token 150 is transferred to device 120 by a non-visual communication method (e.g., email, MMS, etc.), the physical distance between devices 110 and 120 is not an issue, and the devices 110 and 120 can be located anywhere to send and receive the visual tag, and device 120 can obtain/download the source data regardless of the distance between devices 110 and 120.

In a scenario that device 110 is the source device (relevant arrows are not shown in FIG. 1A for simplicity), the metadata associated with accessing the source data 135 by device 120 (e.g., token 150) can be generated by device 110 and stored in device 110 and can be readily accessed and encoded to generate visual tag 155, which can be made available to device 120 as mentioned above. Device 120 may then decode the visual tag and use token 150 (retrieved from the visual tag) to download source data 135 from device 110 (relevant arrows are not shown in FIG. 1B for simplicity).

Regardless of whether a source device is a local device or a remote device, device 120 may download source data 135 by using one or more communication protocols. By way of illustration without limitation, such protocols may be one or more of the following or another communication protocol: a peer-to-peer (P2P) protocol, an interactive connectivity establishment (ICE) protocol, a session initiation protocol, a Bluetooth protocol (BT), a wireless fidelity (WiFi) protocol, a near field communication protocol, an extendable messaging and presence protocol (XMPP), a push protocol, or a non-industry standard communication protocol.

In an aspect, device 120 may comprise a mobile device provided to a new employee of a business entity (e.g., a company, corporation, organization, firm, etc.) and device 110 may be a mobile device used by an information technology (IT) person of the business entity. The IT person may use device 110 to setup or configure device 120 of a number of new employees by using a visual tag technique, i.e., simply displaying a visual tag (e.g., visual tag 155) on device 110 and allow each new employee to scan the visual tag 155 using a built-in camera 125 of device 120 or making visual tag 155 available to device 120 via a non-visual communication method. The visual tag 155 once decoded by device 120 may provide information necessary to setup and configure device 120 of the new employee and even contain executable commands, which when executed, for example, by an operating system of device 120, may perform the setup and configurations of the device 120. The IT person may also use the same technique to update information on device 120 of employees when needed. The configuration of device 120 may comprise providing authentication and connection information for connection to a private network, servers and other computers of the business unit. The IT person may also use device 110 to transfer to device 120, using the visual tag technique, a file including metadata relating to a source file that may be located in device 110 or a remote device 130. The new employee may use the metadata to access device 110 using Bluetooth or Wi-Fi or device 130 using Wi-Fi or through a proxy server as will be described herein.

In another aspect, the remote devices 130 and 140 may represent a number of computing devices or servers of the business entity. The IT person may intend to enable one or more users of devices 120 (e.g., a new employee such as IT technician) to log on to one or more of the remote devices 130 and 140 and perform a host of actions such as accessing files and performing device setup, device configuration, or other activities on any of remote devices 130 or 140, utilizing a token decoded from a visual tag. The IT person may transfer token 150 to device 120 of the IT technician using the above-described visual tag technique. Token 150 can provide authorized access by the user of device 120 to remote devices 130 and/or 140.

In an aspect, token 150 may be requested and obtained from one of the remote devices, for example, remote device 130. Device 120 may use token 150 to access device 130 and download source data 135. Although, FIGS. 1A-1D, for simplicity, show that source data 135 is stored in remote device 130, in general, source data 135 may be stored on one or more other remote devices 140 and token 150 may provide access information for connection to the device 140 that holds source data 135 and download permission to download source data 135. In FIG. 1B, for simplicity, only one device 120 is shown. In case of multiple devices 120, for each device 120, device 110 requests and receives from remote device 130 a respective token 150, which may include particulars of that device 120 and can be expirable.

In systems 100C and 100D, devices 110 and 120 are operatively coupled to remote devices 130 and 140 (which may be behind a firewall) via a proxy server 160 (hereinafter "proxy 160"). Proxy 160 can establish various modes of communications (e.g., P2P communication through ICE protocol) over a network (e.g., the Internet) between devices that could not reach others directly otherwise. Accordingly, as shown in FIG. 1C, device 110 may request and obtain information associated with accessing the source data 135 by device 120 (e.g., a token 150) from the remote device 130 through proxy 160, and communicate token 150 to device 120 by using the visual tag technique, as mentioned above. Device 120, may then access remote devices 130 and/or 140 via proxy 160, by using token 150 (for simplicity, only one device 120 is shown and coupling to remote devices 140 via proxy server 160 is not shown in FIG. 1D). In case source data 135 is stored in device 110 (relevant arrows are not shown in FIG. 1D for simplicity), device 120 may access the source data 135 via proxy 160 or by using other communication protocols such as BT protocol, etc. When downloading source data 135, device 120 may not need be in close proximity of device 110.

In one aspect, a visual tag may comprise various shapes placed within a boundary. The boundary may be multi-dimensional. In one aspect, a visual tag is encoded with information (e.g., token). While a visual tag may be visible to a user and identifiable as a tag to a user, the information encoded in the visual tag is not understandable to, or identifiable by, a user when it is displayed to a user or when it is simply scanned, photographed or captured by a camera without decoding the visual tag. Decoding may be carried out by decoding software that may recognize the shapes and utilize decoding keys and algorithms. In one aspect, when a visual tag is provided for display, it is displayed or represented with non-alphanumeric shapes; for example, it is not displayed or represented as binary code (e.g., 1's and 0's).

In one aspect, a visual tag may comprise one or more of the following elements: position marker(s), error correction key(s) and alignment information for the tag. Referring to FIG. 1A, a visual tag 155 may comprise one or more of the following: one or more position markers 155A (e.g., three position markers are shown in this example), version information 155B, error correction keys 155C, an alignment marker 155D, a two-dimensional boundary 155E, format information 155F and timing information 155G. While a square boundary 155E is shown, the shape of the boundary is not limited to this shape.

Figure 2C:
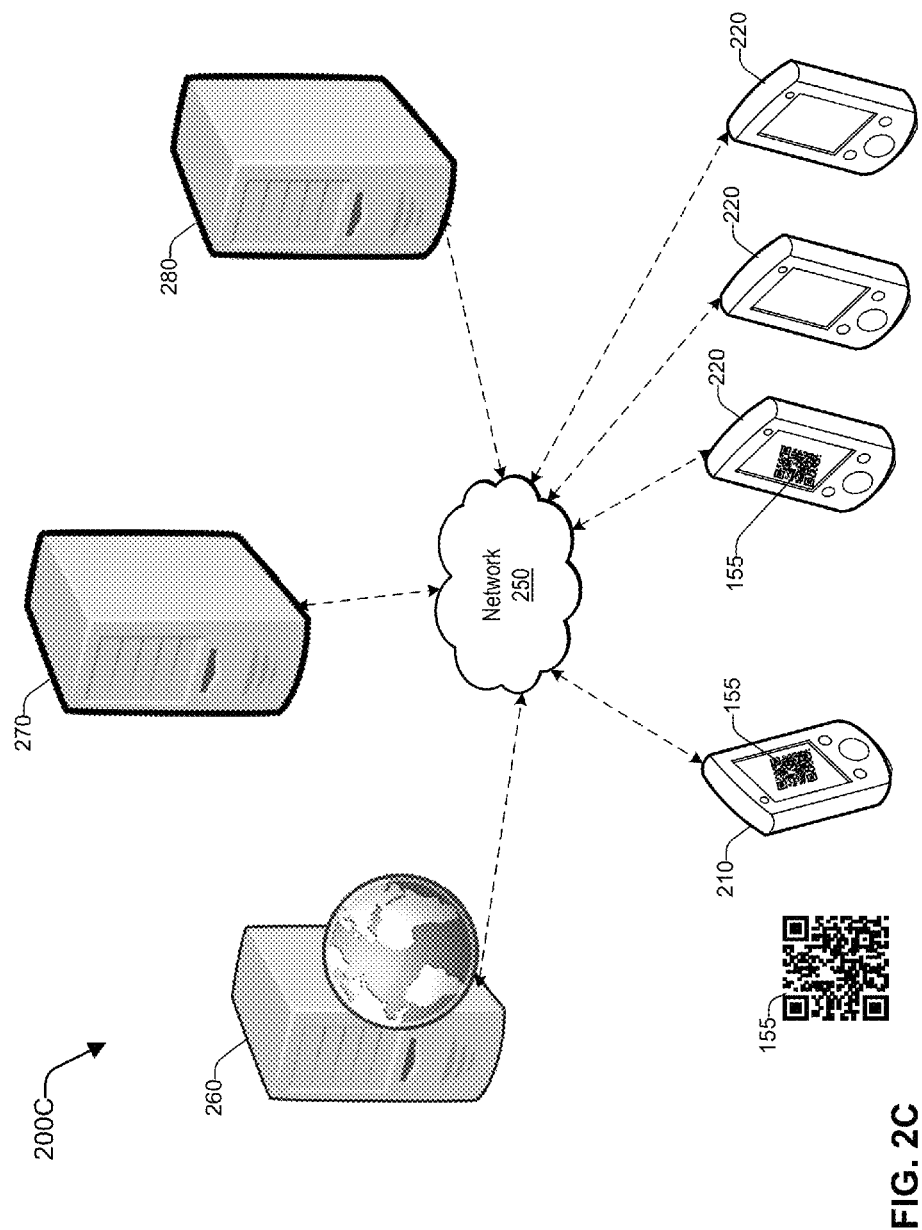

FIGS. 2A-2C are conceptual block diagrams of examples of systems 200A, 200B, and 200C for sharing information using the visual tag 155. System 200A includes device 110, one or more devices 120, network 150, remote device 130, server 230, and cloud server 240. In an aspect, device 110 may instruct remote device 130 to transmit source data 135 of FIG. 1 to another remote device such as a server 230 or a cloud server 240. Device 110 may subsequently request and obtain, for each device 120, a token (e.g., token 150), which is created in real time, from remote device 130. Device 110 may transfer token 150 to each device 120 using the visual tag technique described above. Device 120 may be operatively coupled to remote device 130, server 230, and cloud server 240, via network 250. Token 150 may comprise metadata including information that enables device 120 to connect to any of server 230 or cloud server 240 that has received the source data 135 transmitted by remote device 130, and to download source data 135. In order to access the source data, each device 120 (for simplicity, only one device 120 is shown in FIG. 2B) may use metadata included in token 150 to connect to any of server 230 or cloud server 240, via network 250, and download source data 135.

Network 250 may include, for example, any one or more of a personal area network (PAN), a local area network (LAN), a campus area network (CAN), a metropolitan area network (MAN), a wide area network (WAN), a broadband network (BBN), the Internet, and the like. Further, the network 250 can include, but is not limited to, any one or more of network topologies, including a bus network, a star network, a ring network, a mesh network, a star-bus network, tree or hierarchical network, and the like.

In one example, system 200C includes device 210, one or more devices 220, a web server 260 (e.g., associated with pocketcloud.com), a remote server 270 (e.g., a native access translate (NAT) Traversal server), and source device 280 (optional), coupled via network 250. Device 210 may receive token 150 of FIGS. 1A-1D from remote server 270 (or source device 280) via network 250. In an aspect, source data 135 may be stored in device 210 and device 110 may generate token 150. As mentioned above, device 210 may encode token 150 to generate visual tag 155 and make the visual tag 155 available to device 120 via the visual technique described above. Device 220 may retrieve token 150 from visual tag 155 and use token 150 to access source device 280 or remote device 270, via network 250, to obtain source data 135. In case source data 135 is stored in device 210, token 150 includes access information associated with device 210, and device 220 may access device 210 via network 250 or other modes of communication using communication protocols such as BT protocol, P2P protocol and the like.

In some aspects, token 150 may be encoded in the form of a uniform resource locator (URL) (e.g., HTTP URL) to allow device 220 to access source data 135 via a website (e.g., pocketcloud.com) represented by the URL of token 150. The HTTP URL can be launched through any Web browser without the need for any specialized application. The HTTP URL may point to a Web application that contains necessary JavaScript code to detect whether a suitable application (e.g., a remote access application or a PocketCloud application) is installed locally on device 220 or not. If the local application is installed locally on device 220, the local application can be launched by the Web browser. The local application may proceed to download source data 135 from e.g., source device 280, remote device 270 or device 210, depending on the information encoded in token 150, which includes identification information of the device that stores source data 135. If the application is not installed locally on device 220, the Web browser may communicate back to the Web Server (e.g., Web server 260) and request the Web server to obtain source data 135 from the device that stores the source data 135 (e.g., one of source device 280, remote device 270 or device 210). This may allow the Web browser to subsequently download the file from the Web server 260 without the need of the Web application (e.g., the native application).

Figure 3A:
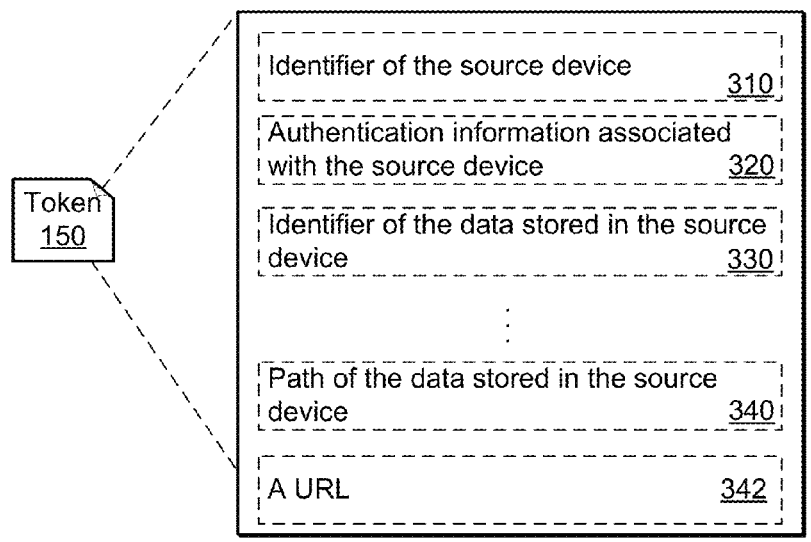
FIGS. 3A-3B are diagrams of examples of tokens including metadata associated with source data shared using the visual tag.
Figure 3B:
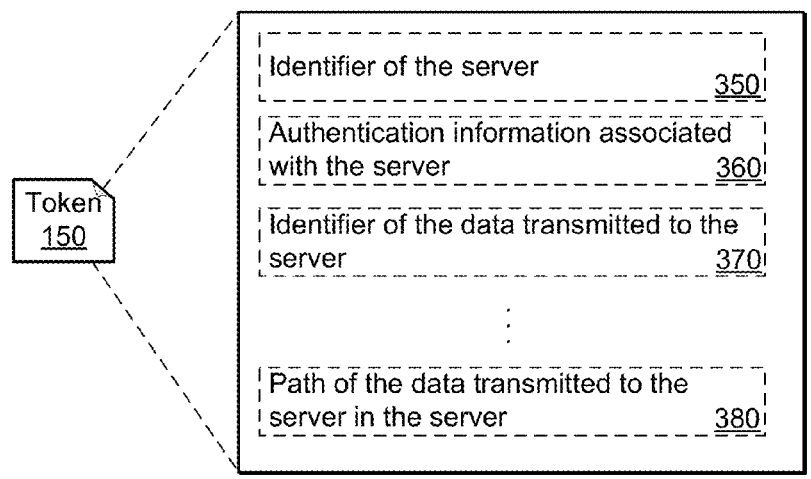

FIGS. 3A-3B are diagrams of examples of tokens 150 including metadata associated with source data 135 of FIG. 1A shared using the visual tag 155 of FIGS. 1A-1D. As mentioned above, source data 135 to be shared by user of device 110 of FIG. 1A with users of devices 120 of FIG. 1A may be stored in remote devices 130 or 140 of FIGS. 1A-1D. For this scenario, token 150 may comprise a number of metadata. For example, token 150 may comprise, among other things, information relating to the remote devices such as an identifier 310 and authentication information 320 associated with any of source devices (e.g., device 130 or 140, device 110 or devices 270, 280 and 220 of FIG. 2C) that holds the source data 135. Token 150 may also comprise information pertaining to the source data 135, for example, an identifier 330 and a path 340. The identifier 330 may identify a file that contains source data 135 among other files, and path 340 may show a path in the file system of the source device that points to the file containing source data 135. Token 150 may be encoded in the form of a URL 342 (e.g., HTTP URL), which can be launched through any Web browser without the need for any specialized application.

In another scenario discussed with respect to FIGS. 2A-2B above, the source data is transmitted from device 130 of FIGS. 2A-2B to one or more remote servers (e.g., server 230 or cloud server 240 of FIGS. 2A-2B). Token 150, in this scenario, may comprise among other things, information relating to the remote servers such as an identifier 350 and authentication information 360 associated with any of server 230 or cloud server 240 that holds the source data 135. Token 150 may also comprise information pertaining to the source data 135, for example, an identifier 370 and a path 380. The identifier 370 may identify a file that contains source data 135 among other files stored in the remote servers (e.g., server 230 cloud server 240), and path 380 may show a path in the file system of the remote servers that points to the file that contains source data 135. Token 150 may be issued by the remote device 130 with an expiration time (including date), after which the remote device 130 may not accept token 150 as being valid. Token 150 may also uniquely represent, or be uniquely associated with, one or more of the following: the source data 135, the device 120, the user of the device 120, and a time related to creation or usage of token 150. In one aspect, token 150 is generated based on, or as a function of (e.g., a hash function), one or more of the following: the source data 135, the identity of device 120, the identity of the user of the device 120, and a time related to creation or usage of token 150. Token 150 may be a non-public, unique token. Token 150 may be a secure (or encrypted) token. In one aspect, token 150 is temporary and not permanent, and is generated only after the source data 135 for sharing is identified or selected by device 110.

Figure 4:
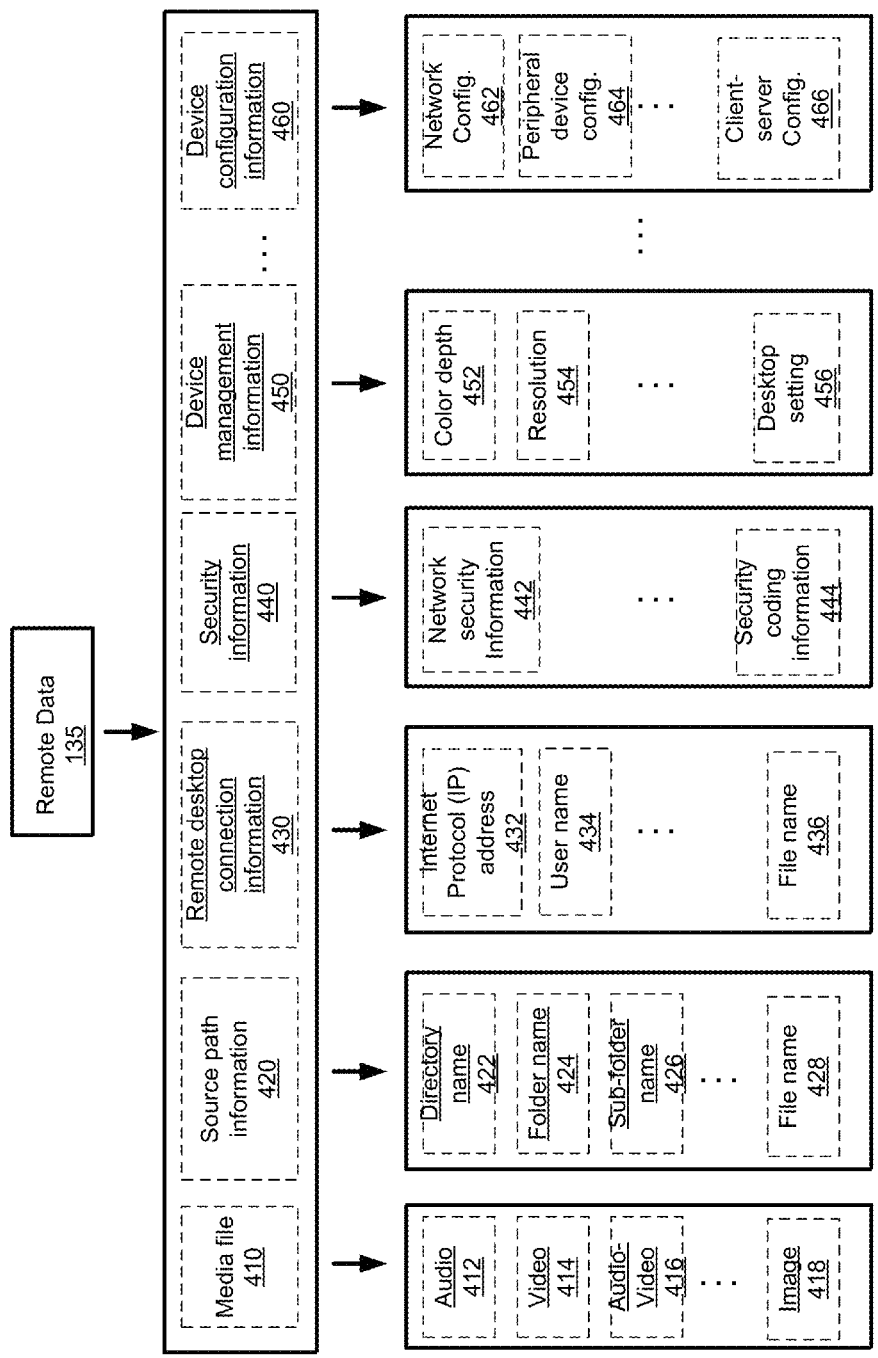
FIG. 4 is a block diagram of an example of a source data that can be shared using the visual tag.

FIG. 4 is a block diagram of an example of source data 135 that can be shared using the visual tag 155 of FIGS. 1A-1D. Although the metadata relating to the source data 135 (i.e., token 150 of FIGS. 3A-3B) may be limited in size such that the token 150 can be encoded using a visual coding technique to generate the visual tag 155, no limitation regarding the size or the type of information in the shared source data 135 is exerted by the subject technology. For example, source data 135 may comprise, among other information, media files 410, source path information 420, remote desktop connection information 430, security information 440, device management information 450, and device configuration information 460. Media files may include, for example, audio files 412 (e.g., music, recorded voice and recorded sounds, etc.) video files 414 (e.g., files containing frames of images such as video clips), audio-video files 416 (e.g., movies, video clips with sound), images 418 (e.g., personal picture, graphic arts, images of various objects, advertisement images, etc.) or other files such as text files including PDF files. Remote path information 420 may include, for example, a directory name 422, a folder name 424, a subfolder name 426 and a file name 428. Source path information 420 may provide for a user of device 120 of FIGS. 1A-1D to access a remote device and update a file. For example, an IT person may use path information 426 to update or make changes to certain files in an employee's computer.

Remote desktop connection information 430 may include, for example, an Internet Protocol (IP) address 432, a user name 434, and a file name 436. Remote desktop connection information 430 may facilitate for a mobile device user (e.g., user of device 120) to remotely connect to desktop of a remote computer (e.g., a personal computer) and access a file identified by the file name 436. Security information 440 may include, for example, network security information 422 (e.g., security tokens such as shared secrets and the like) and security coding information 444 (e.g., cryptographic information such as public—keys and the like). Security information enables the user of device 120 to access secured remote computers or servers.

Device management information 450 may include, for example, color depth 452, resolution 454, and desktop settings 456. Device management information 450 may be useful for a user of a mobile device (e.g., device 120) and may enable the user to modify various features (e.g., resolution, color, or other settings) of, for example, his/hers desktop computer, remotely, from the mobile device. Device configuration information 460 may include, for example, network configuration information 462, peripheral device configuration information 464, and client-server configuration information 466. A user of a mobile device (e.g., device 120) may use network configuration information 462 to configure a device (e.g., the mobile device a remote device such a desktop computer) for connection to a network (e.g., PAN, a LAN, a CAN, a MAN, a WAN, etc.). Peripheral device configuration information 464 may, for instance, be used by the user of device 120 to configure a device (e.g., device 120, or a remote device such as a remote computer) for connection to a printer (e.g., a dedicated printer or a network printer) or a television for connection to another device such as digital video recorder (DVR). Client server configuration information 466 may provide a user of device 120 to configure a number of remote computers as clients or servers.

Figure 5:
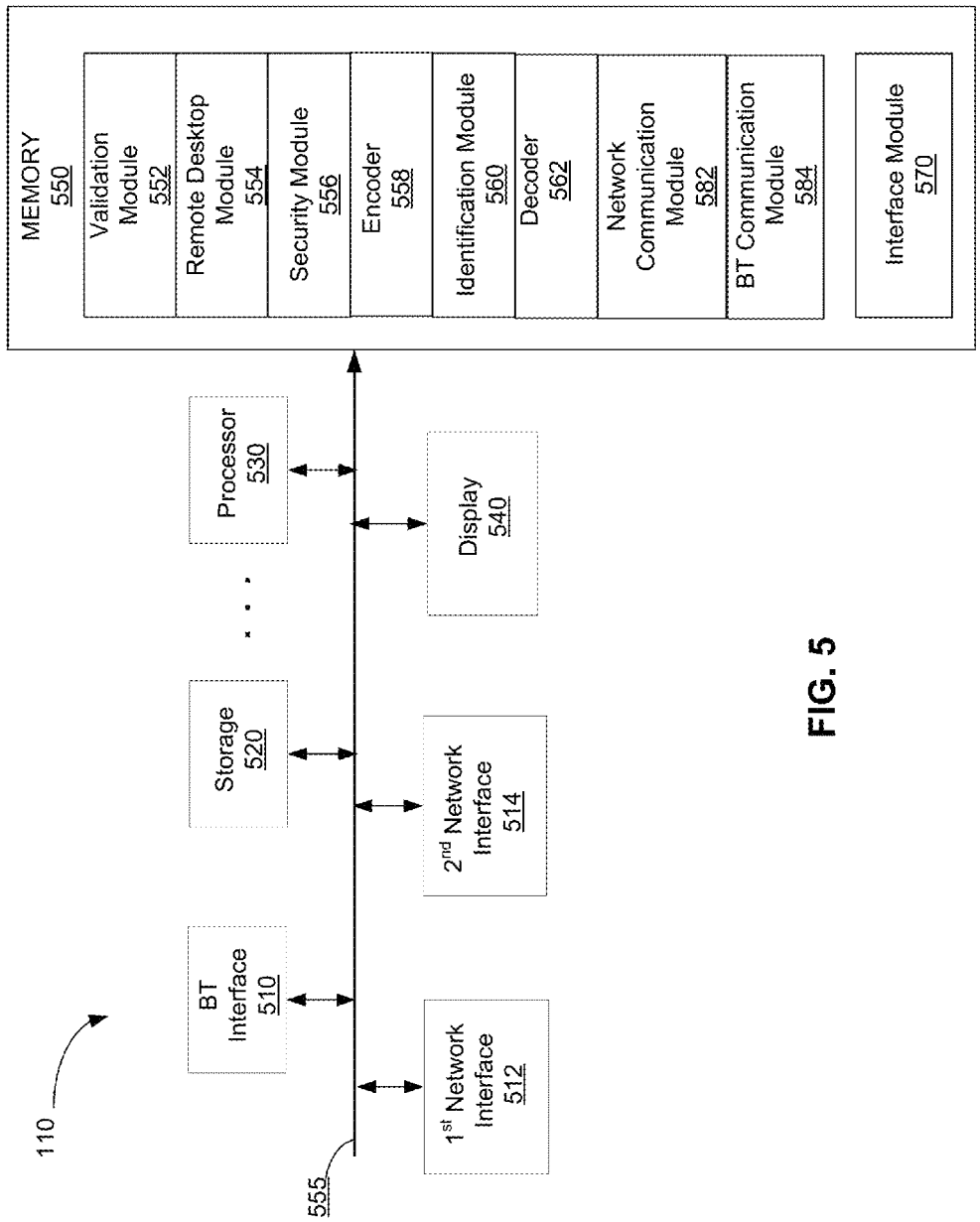
FIG. 5 is a conceptual block diagram of an example of a device for sharing information using the visual tag.

FIG. 5 is a conceptual block diagram of an example of a device 110 of FIGS. 1A-1D or device 210 of FIG. 2C for sharing information using the visual tag 155 of FIGS. 1A-1D. In the following, for simplicity, references are made to devices 110 and 120. Such references may also be valid for devices 210 and 220 of FIG. 2C. Device 110 may include a Bluetooth (BT) interface 510 storage 520, a processor 530, a first network interface 512, a second network interface 514, a display 540, and a memory 550 operatively coupled to one another via a bus 555. It should be understood that communication means other than busses can be utilized with the disclosed configurations. Memory 550 may store various software modules such as a validation module 552, a remote desktop module 554, a security module 556, an encoder 558, an identification module 560, a decoder module 562, a network communication module 582, and an interface module 570. Display 540 may facilitate transfer, using the visual tag technique, between device 110 and one or more devices 120 of FIGS. 1A-1D, where a token 150 of FIGS. 3A-3B encoded via encoder 558 is scanned by device 120. In an aspect, device 110 may use first network interface 512 to communicate with a remote device (e.g., remote devices 130 or 140 of FIGS. 1A-1D, or devices 270 or 280 of FIG. 2C) using a first communication protocol (e.g., hyper text transfer protocol (HTTP)) to connect to the remote device 130 via a network (e.g., network 250 of FIGS. 2A-2B). In another aspect, device 110 may use second network interface 514 to communicate with the remote device 130 using a second communication protocol (e.g., P2P protocol, an ICE protocol, a session initiation protocol, a BT protocol a Wi-Fi protocol, an XMPP, a push protocol, or a non-industry standard communication protocol). When using second network interface 514, device 110 may connect to the remote device through a proxy server 160 of FIGS. 1C-1D.

Encoder 558 may comprise various portions, where a first portion (e.g., a visual encoder portion) may facilitate encoding information for visual encoding, and a second portion(s) may facilitate encoding information, optionally, in conjunction with items such as 582 and/or 584 to allow the encoded information to be sent out via items such as 510, 512 and/or 514. Decoder 562 may comprise various portions used to facilitate decoding information, optionally, in conjunction with items such as 582 and/or 584, when information is received via items such as 510, 512 and/or 514. In one aspect, a BT interface/BT communication module can refer to another type of short-range communication interface/communication module.

When a first user (e.g., the user of device 110 or 210) decides to share a source data 135 of FIG. 4 with a second user (e.g., a user of device 120), the first user may start an application in device 110. The application may comprise remote desktop module 554 and identification module 560. Remote desktop module 554 may be configured to facilitate providing for display a desktop representation of a remote device on a display 540 of device 110. Remote desktop module 554 may facilitate providing for display various files on the remote device that may be selected for sharing. The identification module 560 (e.g., in conjunction with remote desktop module 554) may be configured to facilitate searching for or selecting source data 135 and identifying source data 135 and providing an identification information of source data 135. The identification information may comprise, for example, one or more identifiers (e.g., a device name, an IP address, etc.) of the source device (e.g., remote devices 130 or 140 of FIGS. 1A-1D, devices 270 or 280 of FIG. 2C, device 110, or 210), a path in a file system of the source device, or a file name that identifies a file that contains the source data 135. The first or second network interfaces 512 or 514 may facilitate connection to the source device, and communicating the identification information to the source device. The source device may create token 150 in real time and provide token 150 to device 110, which can be received by one of the first or second network interfaces 512 or 514. In an aspect, the provided token 150 sent over proxy server (e.g., proxy server 160) using a communication protocol (e.g., XMPP or ICE) is encoded based on the communication protocol. At device 110, decoder 562 may facilitate decoding the encoded token 150, before encoder 558 facilitates encoding token 150 to enable transfer of token 150 via the visual tag technique.

Figure 6:
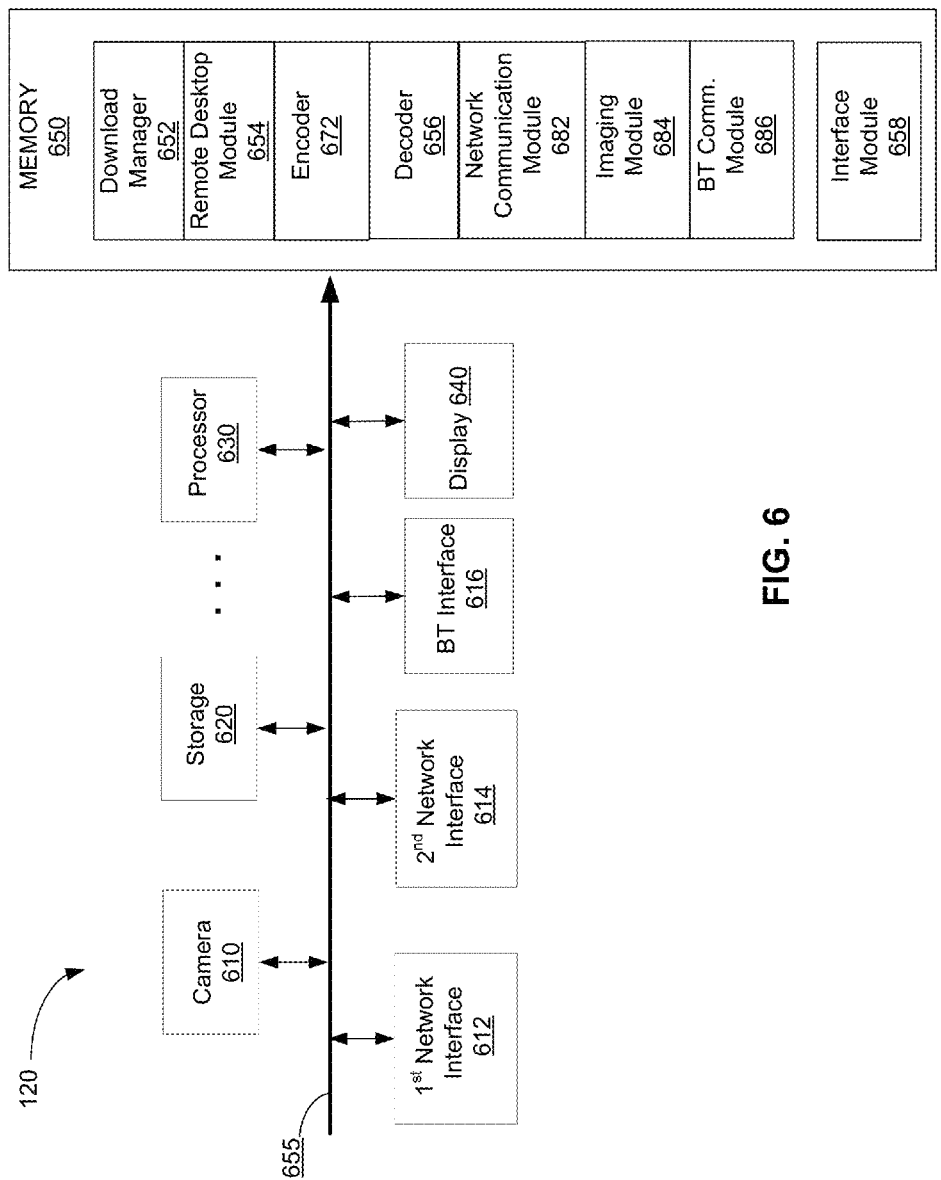
FIG. 6 is a conceptual block diagram of an example of a device for receiving shared information using the visual tag.

When device 120, as described in more detail with respect to FIG. 6, connects to the remote device (e.g., remote devices 130 or 140 of FIGS. 1A-1D, devices 270 and 280 of FIG. 2C, device 110, or device 220) and attempts to access source data 135, the source device, for example, obtain an identifier of device 120 or a user of the device 120 and inform device 110 of the attempt. At device 110, security module 556 may facilitate one or more security measures. For example, security module 556 may cause first or second network interfaces 512 or 514 to receive the identifier of device 120 or the user of the device 120 from the remote device. Validation module 552 may validate the identifier by displaying the identifier using display 540 and receiving approval from the user of device 110. Security module 556 may subsequently cause first or second network interfaces 512 or 514 to communicate the approval to the source device to enable authentication of device 120 or the user of device 120. In one aspect, security module 445 may cause first or second network interfaces 512 or 514 to communicate to the remote device information that can identify device 120 or the user of device 120, to enable the remote device to authenticate device 120 or the user of device 120 when device 120 attempts to access source device to download source data 135.

The interface module 570 may provide user interfaces for communication of various information to the user of device 110. For example, a user interface provided by interface module 570 and displayed on display 540 may be configured to receive inputs from the user of device 110, for example, the approval discussed above with respect to the security measures. Display 540 may include a liquid crystal display (LCD) or a touch sensitive display. Processor 530 may be a general-purpose processor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Processor 530 may execute various applications and software modules stored in memory 550, for example, validation module 552, remote desktop module 554, security module 556, encoder 558, etc. In one aspect, some of the applications or modules may be implemented as firmware.

In some aspects, various application and software modules such as validation module 552, remote desktop module 554, security module 556, encoder 558, and the like may be stored on storage 520, which may include one or more machine-readable media. Storage 520 may include a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. The machine-readable medium may be a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media. Non-transitory medium includes volatile and non-volatile memories.

Still referring to FIG. 5, in one aspect, utilizing BT interface 510 and BT communication module 584 device 110 may detect presence of device 120, for example, automatically without user intervention. For instance, the operating system of device 110 may execute BT communication module 584 that can monitor and detect presence of BT-enabled devices. Upon detection of presence of device 120, the BT communication module 584 may initiate the application (e.g., the application described with reference to FIGS. 5, 7A and 8A) for sharing information, for example, automatically without user intervention. Identification module 560 of the application may enable a user of device 110 to identify or select source data 135 for sharing (e.g., identification or selection of a remote device(s) and a file(s) therein) by, for example, providing for display a graphical user interface to allow the user to select a source data among a plurality of source data or allow the user to enter information that identifies the source data (e.g., type in the name of the file). Based on the detection of the presence of device 120, identification module 560 may also determine an identifier of device 120. In one example, if multiple devices 120 are detected, then identification module 560 may provide for display the devices that are detected to allow the user of device 110 to select one or more of the detected devices for sharing the source data. BT communication module 584 may also facilitate communication of visual tag 155 from device 110 to device 120.

In one aspect, device 110 is a hardware device (including software) and is a communication end point device. Device 110 may be, for example, a device handled by an end user. Device 110 typically has a user interface module/device (e.g., items 570, 540) to provide/receive information to/from a user. In one aspect, device 110 is not a router or an access point that simply routes data transmissions initiated by another hardware device. As a communication end point device, device 110 may initiate a data communication. Device 110 (e.g., utilizing items 560, 570) may initiate sharing of a source data, for example, based on a user action at device 110 (e.g., based on the selection of the source data and/or selection of device 120). In one aspect, device 110 (e.g., utilizing items 560, 570) may determine the final end destinations of a data communication. For example, item 560 of device 110 may decide that the final end destinations of a data communication are devices 110 and 130 for requesting and receiving a token. Upon receiving and processing the token, device 110 may decide the final end destinations of a data communication are devices 110 and 120 for sending and receiving the processed token, and device 110 may initiate this transaction with device 120.

Device 110 may also initiate a remote desktop session between device 110 (as a first end point) and device 130 (as a second end point) to provide for display at device 110 a representation of the entire desktop of device 130 (or a representation of files or folders on device 130), to allow accessing any and all files on device 130 (or allow accessing files that the user of device 110 is permitted to access), and to exchange the request for, and receipt of, a token.

In one aspect, device 120 is a hardware device (including software) and is a communication end point device. For example, upon receiving a token, device 120 (e.g., item 652 in FIG. 6) may determine that the final end destinations of a data communication are devices 120 and 130 for requesting and downloading the source data and may initiate the downloading transaction.

In one aspect, device 130 is a hardware device (including software) and is a communication end point device. For example, device 130 may be the final destination point to receive a request from device 110 to generate a token for the identified source data. Device 130 may be the final destination point to receive a request from device 120 to provide the source data to device 120.

In one aspect, source data 135 may be non-public information (e.g., information stored on a remote device that is not generally accessible to the public without specific permission). A non-public remote device may be a server that is not an HTTP server.

In one aspect, each of items 510, 520, 530, 555, 512, 514 and 540 comprises hardware, and each of items in memory 550 comprises software. In one aspect, each of items 510, 520, 530, 555, 512, 514 and 540 may comprise hardware and software. Item 510 may comprise software such as items 554. Each of items 512 and 514 may comprise software such as items 556, 560 and/or 582.

FIG. 6 is a conceptual block diagram of an example of a device 120 of FIGS. 1A-1D or device 220 of FIG. 2C for receiving shared information using the visual tag 155 of FIGS. 1A-1D. In the following, for simplicity, references are made to devices 110 and 120. Such references may also be valid for devices 210 and 220 of FIG. 2C. Device 120 may include a camera 610, storage 620, a processor 630, a first network interface 612, a second network interface 614, a BT interface 616, a display 640, and a memory 650 operatively coupled to one another via a bus 655. It should be understood that communication means other than busses can be utilized with the disclosed configurations. Memory 650 may store various applications and software modules such as a download module 654, a remote desktop module 654, a decoder 656, an interface module 658, an encoder 672, an BT communication module 686, and a network communication module 682 including a Web browser and an application (e.g., a remote access application, PocketCloud application). Camera 610 may facilitate capturing an image of visual tag 155 and transfer of token 150 of FIGS. 3A-3B between devices 120 and device 110 of FIGS. 1A-1D. Decoder 656 may decode the visual tag 155 to retrieve token 150. The decoded token 150 may subsequently (e.g., prior to an expiration date of token 150) be used by device 120 to access source data 135 of FIG. 4 stored on one of the source devices (e.g., remote devices 130 or 140 of FIGS. 1A-1D, devices 270 and 280 of FIG. 2C, device 110, or device 220).

Encoder 672 may comprise various portions used to facilitate encoding information, optionally, in conjunction with items such as 682 and/or 686, when information is to be sent via items such as 612, 614 and/or 616. Decoder 656 may comprise various portions, where a first portion (e.g., a visual decoder portion) may facilitate decoding information from a visual tag, optionally, in conjunction with item 684, and a second portion(s) may facilitate decoding information, optionally, in conjunction with items such as 682 and/or 686. In one aspect, a BT interface/BT communication module can refer to another type of short-range communication interface/communication module.

Download manager 562 may facilitate accessing the remote device and downloading source data 135 using decoded token 150 within a time period prior to the expiration time of token 150. Download manager 562 may cause first network interface 612 to access the remote device, via a network (e.g., network 250 of FIGS. 2A-2B), using a communication protocol such as HTTP. In one aspect, download manager 562 may cause first network interface 614 to access the source device, via a proxy server (e.g., proxy server 160 of FIGS. 1C-1D), using a communication protocol such as XMPP or ICE. Remote desktop module 654 may be configured to facilitate displaying a desktop representation of a source device on a display 640 of device 120. Interface module 658 may provide user interfaces for communication of various information to the user of device 120. For example, a user interface provided by interface module 658 and displayed on display 640 may be configured to receive inputs from the user of device 120, for instance, a location in device 120, where the user wishes to store the downloaded source data 135.

In some aspects, token 150 may include a HTTP URL to allow device 220 to access source data 135 via a website (e.g., pocketcloud.com) represented by the URL of token 150. The HTTP URL can be launched through the Web browser without the need for any specialized application. The HTTP URL may point to a Web application that contains necessary JavaScript code to detect whether an appropriate application (e.g., PocketCloud application) is locally installed on device 220 or not. If the local application is installed locally on device 220, the local application can be launched by the Web browser. The local application may proceed to download source data 135 from the source device. If the necessary application is not installed on device 220, the Web browser may communicate back to the Web Server (e.g., Web server 260 of FIG. 2C) and request the Web server to obtain source data 135 from the device that stores the source data. This may allow the Web browser to subsequently download the file from the Web server 260 without the need of the Web application (e.g., the native application).

Display 640 may include a liquid crystal display (LCD) or a touch sensitive display. Processor 630 may be a general-purpose processor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. Processor 630 may execute various applications and software module stored in memory 650, for example, download manager 652, remote desktop module 654, decoder 656, imaging module 684, BT communication module 686, and interface module 658. In one aspect, some of the applications or modules may be implemented as firmware. In some aspects, various applications and software modules such as download manager 652, remote desktop module 654, decoder 656, and interface module 658 may be stored on a storage 620, which may include one or more machine-readable media. Storage 620 may include a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. The machine-readable medium may be a single medium or multiple media (e.g., a centralized or distributed database, and/or associated caches and servers) that store the one or more sets of instructions.

In one aspect, each of items 610, 620, 630, 655, 612, 614, 616 and 640 comprises hardware, and each of items in memory 650 comprises software. In one aspect, each of items 610, 620, 630, 655, 612, 614, 616 and 640 may comprise hardware and software. Item 610 may comprise software such as items 684. Each of items 612, 614, and 616 may comprise software such as items 652, 672, 686 and/or 682.

Figures 7A, 7B:
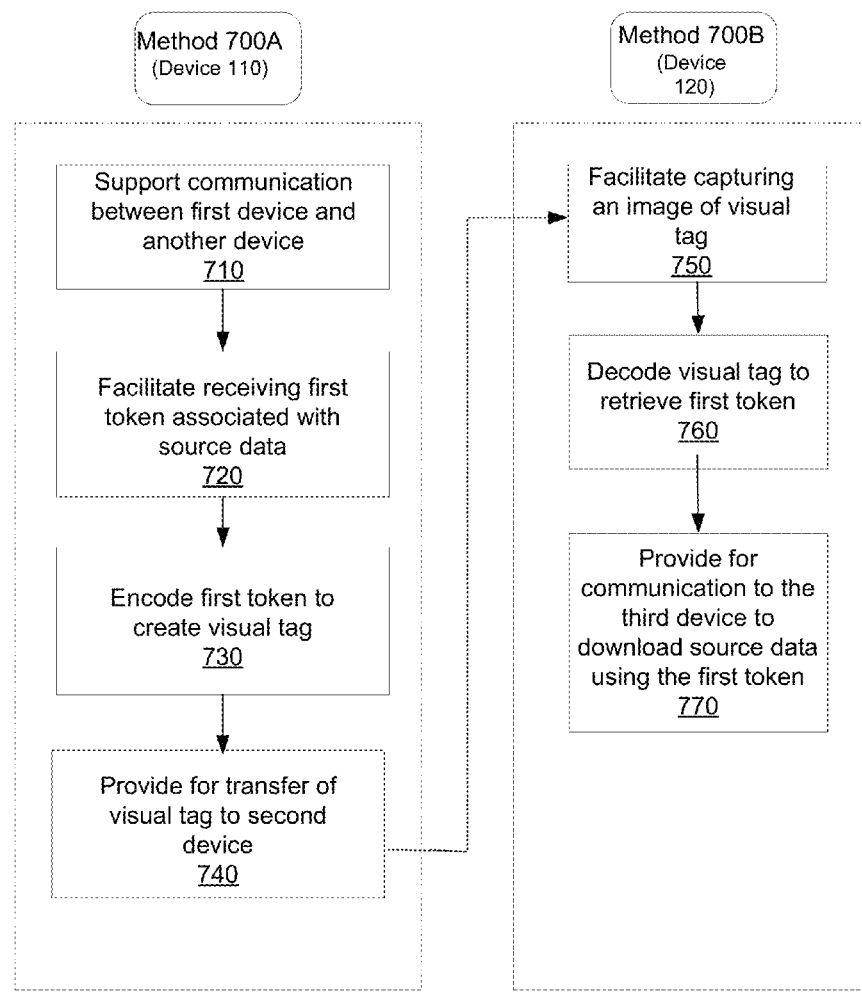
FIGS. 7A-7D are flowcharts illustrating exemplary methods for sharing information using the visual tag.

FIGS. 7A-7B are flowcharts illustrating exemplary methods 700A and 700B for sharing information using the visual tag 155 of FIG. 1A-1D or device 210 of FIG. 2C. In the following, for simplicity, references are made to devices 110 and 120 of FIGS. 1A-1D. Such references may also be valid for devices 210 and 220 of FIG. 2C. Method 700 A is implemented at device 110 of FIGS. 1A-1D and begins at operation 710, where device 110 supports communication based on a first protocol (e.g., HTTP or XMPP) between device 110 and the source device (e.g., remote devices 130 or 140 of FIGS. 1A-1D, devices 270 and 280 of FIG. 2C, device 110, or device 220). For example, identification module 560 may determine or provide identification information of the source data, and interface 512 or 514 may receive the identification information directly or indirectly through one or more other items such as network communication module 582 (that may provide software support for item 512 and/or 514) and/or encoder 558. Interface 512 or 514 may then facilitate transmission of the identification information from device 110 to remote device 130 utilizing the first protocol. Hence, at least one of items 560, 512, 514 and/or other items (e.g., 582) may support communication based on the first protocol between devices 110 and 130. Information may be encoded into the first protocol utilizing items such as 558 and/or 582.

At operation 720, device 110 facilitates receiving token 150 of FIGS. 3A-3B that is associated with source data 135 of FIG. 4. For example, interface 512 or 514 may receive token 150, which may then be received by one or more items such as items 582, 562, 558 for processing. Hence, at least one of items 512, 514, 582, 562, 558 and/or other items may facilitate receiving token 150.

Device 110 (e.g., encoder 558 and/or other items such as item 581) may initiate encoding, or encode, token 150 to generate visual tag 155 for display using display 540 (operation 730). At operation 740, device 110 may facilitate transferring visual tag 155 to one or more devices 120, for instance, by displaying visual tag 155 to enable one or more devices 120 of FIGS. 1A-1D to capture the visual tag or communicating visual tag 155 to device 120. For example, encoder 558 and interface module 540 may allow token 150 to be visually encoded and displayed to device 120. Hence, at least one of items 558, 584, 510 and/or other items may provide for communication to device 120 the encoded token 150. In one aspect, once device 110 identifies or selects a source data, all of the operations shown in FIG. 7A may be carried out automatically without user intervention. In one aspect, device 120 is within close proximity of device 110, if a camera of device 120 can capture the visual tag displayed by device 110. In one example, a camera of device 120 may be within 20 feet of the location where the visual tag is displayed.

Method 700B is implemented at device 120 and begins at operation 750, where device 120 facilities capturing an image of visual tag 155 from display 540 of device 110. In one example, item 684 may perform or facilitate performing operation 750. Device 120 may subsequently decode visual tag 155 to retrieve token 150, which was encoded using a visual coding technique (operation 760). In one example, item 656 may perform or facilitate performing operation 760. At operation 770, device 120 may provide for communication, based on a communication protocol (e.g., P2P protocol, an ICE protocol, a session initiation protocol, a BT protocol a Wi-Fi protocol, an XMPP, a push protocol, or a non-industry standard communication protocol, or HTTP), to the source device to download source file 135 using retrieved token 150. In one example, at least one of items 612, 614, 672, 682 and/or other items may perform or facilitate performing operation 770.

In one advantageous example, some or all of the operations shown in FIG. 7B are performed automatically without user intervention.

Figures 8A, 8B:
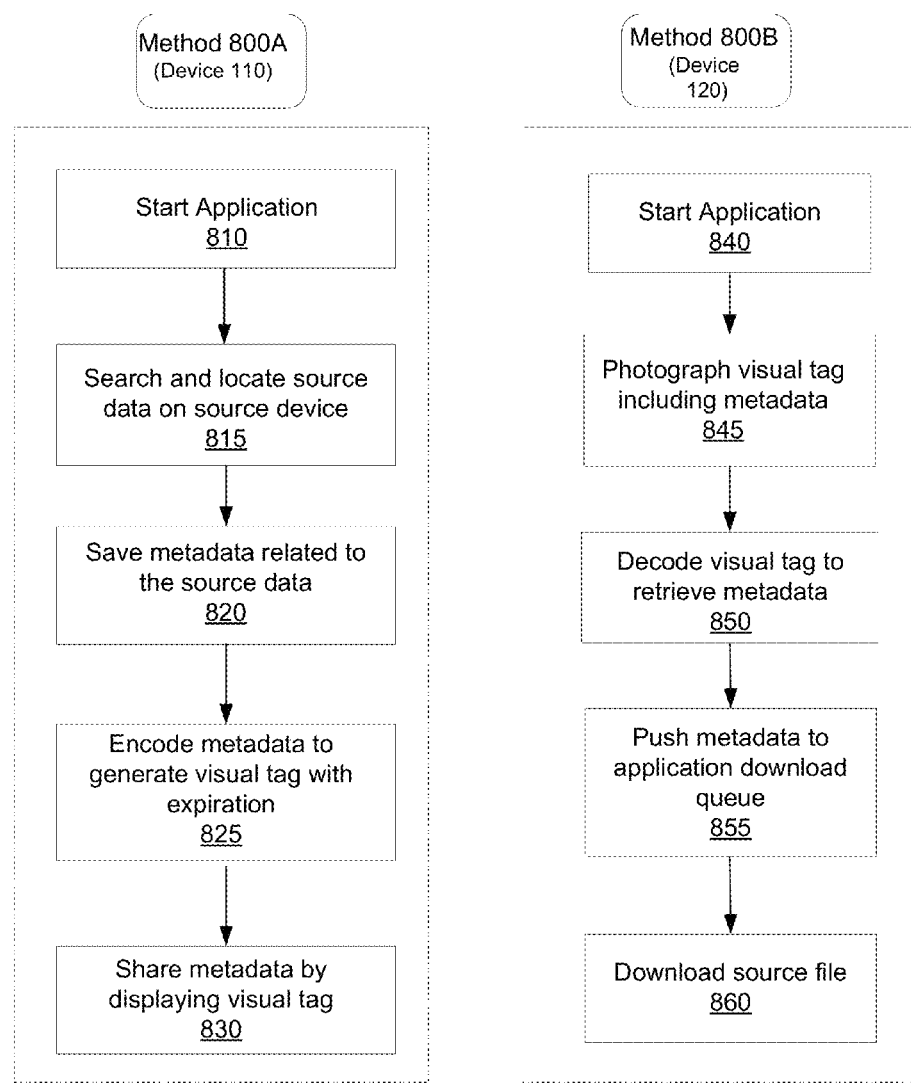
FIGS. 8A-8B are flowcharts illustrating exemplary methods for sharing information using the visual tag.

FIGS. 8A-8B are flowcharts illustrating exemplary methods 880A and 800B for sharing information using the visual tag 155 of FIG. 1A-1D. In the following, for simplicity, references are made to devices 110 and 120 of FIGS. 1A-1D. Such references may also be valid for devices 210 and 220 of FIG. 2C. Method 800A may be implemented at device 110 of FIGS. 1A-1D and begins at operation 810, where a user of device 110 starts an application on device 110 to share a source data with a user of device 120 of FIGS. 1A-1D. At operation 815, using the application, the user of device 110 searches and locates (or selects from a list) source data 135 of FIG. 4 stored on a source device (e.g., remote devices 130 or 140 of FIGS. 1A-1D, devices 270 and 280 of FIG. 2C, device 110, or device 220). Device 110 may receive metadata (e.g., token 150 of FIGS. 3A-3B) related to source data 135 and save the metadata on device 110 (operation 820). At operation 825, device 110 may encode metadata using visual encoding to generate visual tag 155 with an expiration date. The encoded metadata is subsequently shared with device 120 by displaying visual tag 155 on display 540 of FIG. 5 or by communicating visual tag 155 to device 120 via one of the communication means described above (operation 830).

Method 800B may be implemented at device 120 and begins at operation 840, where the user of device 120 starts an application for receiving the encoded metadata from device 110, which is located within a close proximity of device 120. At operation 845, device 120 may photograph visual tag 155 displayed on device 110, which includes the metadata. Device 120 may decode tag 155 to retrieve the metadata (operation 850) and at operation 855, push the metadata to the application's download queue. The application may comprise download manager 652 of FIG. 6, a Web browser, or a Web application (e.g., PocketCloud Application). At operation 860, download manager 652 may facilitate downloading source data 135 using the metadata. In some aspects, the source data 135 may be downloaded through the Web browser using a URL included in token 150 or through the Web application.

Figure 9A:
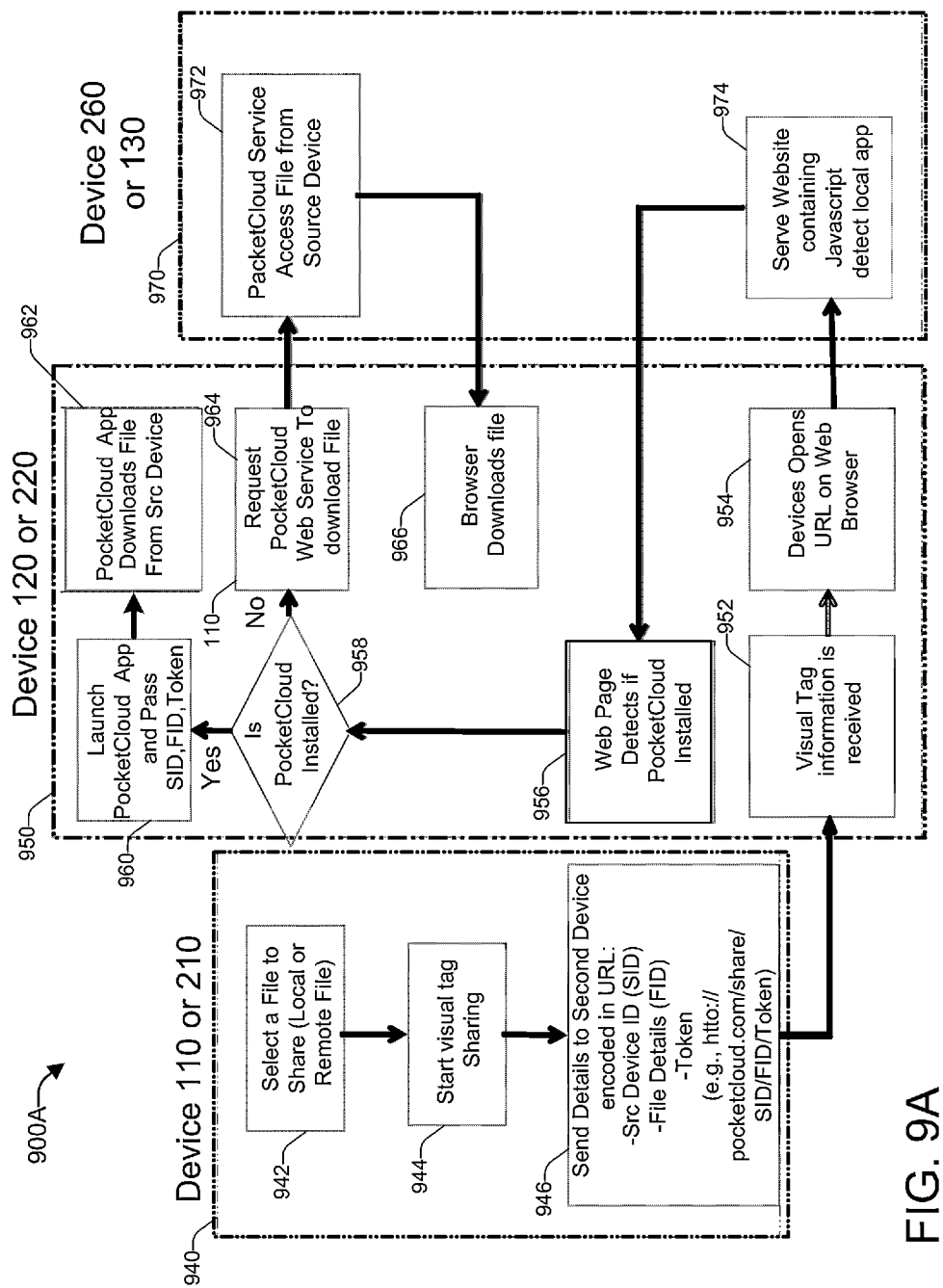
FIG. 9A-9B are flowcharts illustrating exemplary methods for downloading a source file using the information shared based on the visual tag.
Figure 9B:
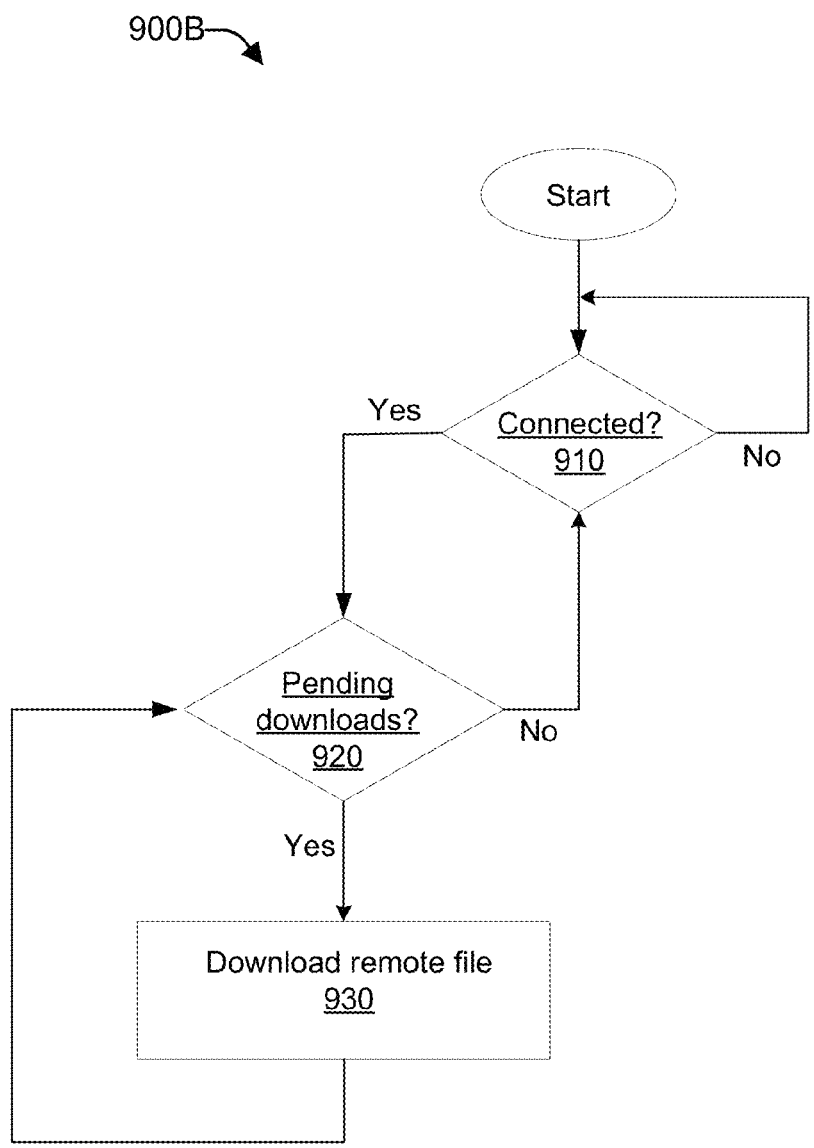

FIGS. 9A-9B are flowcharts illustrating exemplary methods 900 for downloading a source file using the information shared using the visual tag 155 of FIGS. 1A-1D. Method 900A includes portions 940, 950 and 970. Portion 940 may be implemented at device 110 of FIG. 1A-1D or device 210 of FIG. 2C. In the following, for simplicity, references are made to devices 210 and 220 of FIG. 2C. Such references may also be valid for devices 110 and 120 of FIG. 1A-1D. Portion 950 may be implemented at device 120 or 220, and portion 970 may be implemented by device 260 of FIG. 2C or any of devices 130 or 140 of FIGS. 1A-1D. Portion 940 begins with operation 942, where at device 210 a file is selected by the user of device 210 to share with device 210. At operation 944, Visual tag transfer starts between device 210 and 220, as described in more detail above. Using the visual tag transfer technique, metadata encoded in URL, including information such as, source device identification (SID), source file details (FD), and token 150, is communicated to device 220 (operation 946).

Portion 950 of method 900A begins at operation 952, where visual tag information (e.g., the metadata) is received by device 220. Device 220 may use the Web browser to access a web server 260 (operation 954). Server 260, at operation 974, the URL points to Web application that contains necessary JavaScript to detect a local Web application. At operation 956, the Web application detects whether the local Web application is installed on device 220. At control operation 958, if the PocketCloud Web application is installed on device 220, control is passed to operation 960, where the PocketCloud Web application is launched at device 220 and the SID, FD, and token 150 are passed to the PocketCloud application. Subsequently, at operation 962, PocketCloud application downloads the source data 135 of FIG. 1A-1D form the source device (e.g., remote devices 130 or 140 of FIGS. 1A-1D, devices 270 and 280 of FIG. 2C, device 110, or device 220).

Otherwise, if the PocketCloud application is not installed in device 220, control is passed to operation 964, where a request is made to web server 260 (e.g., a PocketCloud server) to download source file 135. Subsequently, at operation 972, server 260 may access source data 135 from the source device. Finally, the Web browser downloads the source file 135 from the web server 260 to device 220 (operation 966).

In method 900B, after the operation starts, download manager 652 of FIG. 6, at control operation 910, may inquire one of first network interface 612 or second network interface 614 of FIG. 6 to find out whether a connection is made between device 120 and the source device (e.g., remote devices 130 or 140 of FIGS. 1A-1D, devices 270 and 280 of FIG. 2C, device 110, or device 220). If the connection is made, the control is transferred to control operation 920, otherwise the download manger 652 keeps inquiring. At control operation 920, device 120 may determine whether there are any files pending to be downloaded. If there is no pending file, control is transferred back to control operation 910. Otherwise, at operation 930, download manager 652 downloads source file 135 using the shared metadata (e.g., token 150 of FIGS. 3A-3B).

Figure 10:
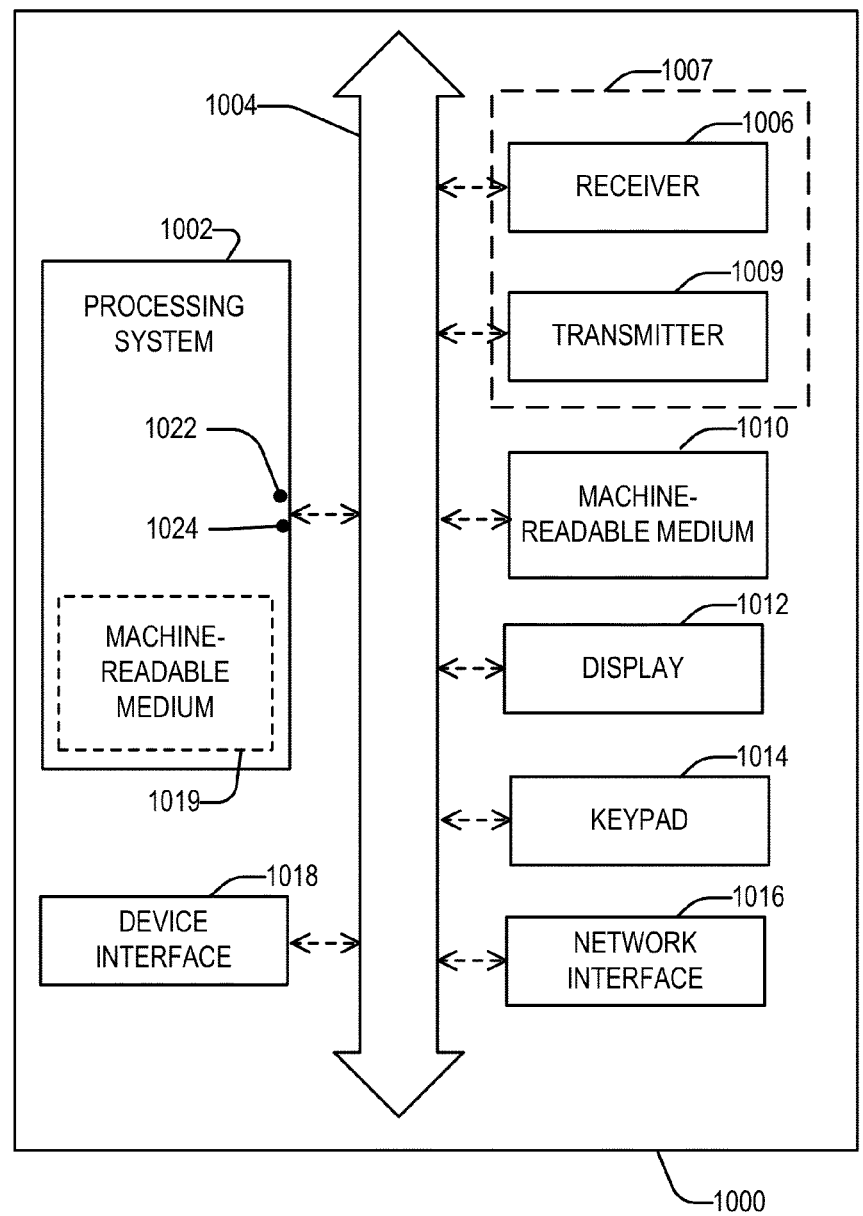
FIG. 10 is a conceptual block diagram of an example of a device or server.

FIG. 10 is a conceptual block diagram of an example of a device or server. System 1000 may comprise remote devices 130 or 140 of FIGS. 1A-1D or server 230 or cloud server 240 of FIGS. 2A-2B, or any device 260, 270, 280. System 1000 may be device 110, 120, 210 or 220. System 1000 includes a processing system 1002, which may include one or more processors or one or more processing systems. A processor 530 or 630 may be processing system 1002, and a processor can be one or more processors. The processing system 1002 is capable of communication with a receiver 1006 and a transmitter 1009 through a bus 1004 or other structures or devices. It should be understood that communication means other than busses can be utilized with the disclosed configurations. Processing system 1002 can generate token 150 of FIGS. 3A-3B. In some aspects, processing system 1002 may generate audio, video, multimedia, and/or other types of data to be provided to the transmitter 1009 for communication. In addition, audio, video, multimedia, and/or other types of data can be received at the receiver 1006, and processed by the processing system 1002.

The processing system 1002 may include a general-purpose processor or a specific-purpose processor for executing instructions and may further include a machine-readable medium 1019, such as a volatile or non-volatile memory, for storing data and/or instructions for software programs. The instructions, which may be stored in a machine-readable medium 1010 and/or 1019, may be executed by the processing system 1002 to control and manage access to the various networks, as well as provide other communication and processing functions. The instructions may also include instructions executed by the processing system 1002 for various user interface devices, such as a display 1012 and a keypad 1014. The processing system 1002 may include an input port 1022 and an output port 1024. Each of the input port 1022 and the output port 1024 may include one or more ports. The input port 1022 and the output port 1024 may be the same port (e.g., a bi-directional port) or may be different ports.

The processing system 1002 may be implemented using software, hardware, or a combination of both. By way of example, the processing system 1002 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 1019) may include storage integrated into a processing system such as might be the case with an ASIC. Machine-readable media (e.g., 1010) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 1002. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a client terminal or server or by a processing system of a client terminal or server. Instructions can be, for example, a computer program including code.

A network interface 1016 may be any type of interface to a network (e.g., an Internet network interface) or a proxy server using XMPP, and may reside between any of the components shown in FIG. 10. For the example of a remote device 130 of FIGS. 1A-1D, the network interface 1016 may be used to communicate with device 110 or 120, for example, to receive identification information and an approval from device 110 and an identifier of device 120 or the user of device 120 from device 120 and to communicate token 150 to device 110 or source data 135 to device 120 over network 250 or via proxy server 160 of FIGS. 1C-1D.

A device interface 1018 may be any type of interface to a device and may reside between any of the components shown in FIG. 10. A device interface 1018 may, for example, be an interface to an external device (e.g., USB device) that plugs into a port (e.g., USB port) of the system 1000.

A transceiver block 1007 may represent one or more transceivers, and each transceiver may include a receiver 1006 and a transmitter 1009. A functionality implemented in a processing system 1002 may be implemented in a portion of a receiver 1006, a portion of a transmitter 1009, a portion of a machine-readable medium 1010, a portion of a display 1012, a portion of a keypad 1014, or a portion of an interface 1016, and vice versa.

The subject technology may provide mechanisms and methodology of transferring information between two or more separate devices to facilitate file sharing, remote desktop connection settings and device management settings, by a visual mechanism of information interchange such as by QR. The above information transfer may otherwise occur locally through device-to-device communications such as with a Wi-Fi or BT connection. The subject technology may also facilitate the final transfer through an intermediary cloud based server infrastructure. The subject technology may be viewed as a simple mechanism for transferring complex information from one device to another. The complex information transfer might include, for example, file sharing, which may involve sharing source path information, remote desktop connection details, security information, device management, setup information, etc.

In one aspect, the subject technology can provide various advantages, including without limitation the following: quick initial information transfer concerning connection information or file information between two distinct devices using a visual approach (by way of a built-in camera) that may lower the threshold of required device hardware/technologies to facilitate information exchange; transfer of remote desktop connection information without requiring user interaction (specifically text entry); and transfer device management information without requiring user interaction (specifically text entry or manual setup).

The two devices may advantageously utilize the built-in display and camera to perform the sharing of information. For example, a mobile application may provide the mechanism to choose the file or connection setting that is meant to be shared. The application may generate the visual tag (e.g., the QR code), as well as scan a previously generated code from another device running the application. The application may handle the final retrieval of and application of the QR encoded information (e.g., file transfer information, remote connection details, and device management details). The QR code may provide a visual tagging standard to encode the information to be shared (e.g., source file location to download, connection details, source file containing connection details or device specific information.) A cloud based server infrastructure may contain software to allow for the downloading of file data that is being shared, connection information for a remote desktop or desktops, or device management information. A Wi-Fi connection can provide the transport necessary to download the file, connection information, or device management information. A Bluetooth connection can provide the transport necessary to download the file, connection information, or device management information.

In one aspect, various elements of the subject technology may comprise: two devices (e.g., smart phones) with built-in camera used to scan the QR code read from or generated from the other device in the pair; a mobile application utilizing the framework of the subject technology; (optional) cloud based server infrastructure; (optional) Wi-Fi connection; (optional) Bluetooth connection. In one aspect, the subject technology may utilize a number of steps, for example, the steps for sharing a source file between two devices, as follows: an application in the first device is used to find a file to share with a second device; the file is optionally uploaded to a remote cloud-based server if the file is to be shared remotely; a QR code may be generated containing the meta information of the file's location; the second device may run an application to scan the QR code and retrieve the meta information. The second device uses this meta information to download either directly through Bluetooth or Wi-Fi, or from a cloud based server infrastructure housing the shared file.

In one aspect, a method for transmitting remote desktop connection information may include the following steps: an application is used to find a remote desktop connection or group of connections to share; a QR code may be generated containing the meta information of the remote desktop connection details; the second device runs a software scan the QR code and to retrieve the meta information; the second device uses this meta information directly to read the encoded information to reproduce the remote desktop connection settings, or download directly through BT, Wi-Fi, P2P connection, or from a cloud-based server infrastructure housing a file containing extended remote desktop connection information.

In one advantageous example, various operations described herein may be performed automatically without user intervention, except that, for example, a process may require a user to identify/select a source data for sharing, to select one or more devices 120, and/or to approve/authenticate device 120 or its user so that device 120 can access the source data.

In one aspect, a communication protocol may comprise one or more communication protocols. In one aspect, a first communication protocol can be the same as a second communication protocol utilized by the same or different devices. In one aspect, a first communication protocol can be different from a second communication protocol utilized by the same or different devices. In one aspect, a notation such as a first device/item can be the same as a second device/item. In one aspect, a notation such as a first device/item can be different from a second device/item.

Illustration of Method/Machine-Readable Storage Medium/Apparatus for Facilitating Sharing Information Among Multiple Devices Using a Visual Tag (Described as Clauses)

Various examples of aspects of the subject technology are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

Examples of Encoding Clauses

1. A non-transitory machine-readable medium (e.g., 520, 550, FIG. 5) comprising instructions stored therein, the instructions executable by one or more processors (e.g., 530, FIG. 5) to facilitate performing a method (e.g., 700A, FIG. 7A) for facilitating sharing source data, the method comprising:
   supporting communication based on a first communication protocol between a first device and a remote device, wherein the communication is associated with source data (e.g., 710, FIG. 7A);
   facilitating receiving a first token associated with the source data (e.g., 720, FIG. 7A);
   facilitating encoding the first token to create a visual tag (e.g., 730, FIG. 7A);
   providing for display the visual tag, to enable a second device to optically capture the visual tag utilizing a camera and to allow the second device to access the source data utilizing the first token from the visual tag and utilizing a second communication protocol, wherein the second device is unable to access the source data without using the first token (e.g., 740, FIG. 7A),
   wherein the first communication protocol is the same or different from the second communication protocol,
   wherein the first device is a communication end point device.

2. The non-transitory machine-readable medium of clause 1, wherein the method comprises identifying the source data, to initiate sharing of the source data, based on a user action at the first device.

3. The non-transitory machine-readable medium of clause 1, wherein the method comprises identifying, at the first device, the source data for sharing, wherein the supporting communication comprises providing for communication, from the first device utilizing the first communication protocol to the remote device through a proxy server, identification information of the source data based on the identifying the source data, wherein the facilitating encoding the first token comprises facilitating encoding the first token using a visual encoding technique, wherein the visual tag comprises a quick response (QR) coded version of the first token.

4. The non-transitory machine-readable medium of clause 1, wherein the method comprises identifying the source data for sharing,
   wherein the supporting communication comprises providing for communication, to the remote device, identification information of the source data, wherein the identification information comprises at least one of an identifier of a source device, a path in a file system of the source device, or a file name,
   wherein the supporting communication comprises providing for communication, to the remote device, a request for the first token,
   wherein the facilitating receiving comprises facilitating receiving the first token in response to the request,
   wherein the source device contains the source data.

5. The non-transitory machine-readable medium of clause 1, wherein the method comprises identifying the source data for sharing,
   wherein the supporting communication comprises facilitating providing identification information of the source data to the remote device to enable generation of the first token in real time in response to the facilitating providing identification information of the source data,
   wherein the facilitating receiving the first token comprises facilitating receiving the first token, at the first device, utilizing the first communication protocol, from the remote device via a proxy server, in response to the facilitating providing identification information of the source data,
   wherein the method comprises, prior to the encoding, decoding the first token received utilizing the first communication protocol,
   wherein the providing for communication to the second device the first token comprises providing for communication from the first device to the second device the first token,
   wherein the method comprises providing for communication from the first device to the second device other information for accessing the source data, wherein the other information comprises location of the source data, wherein a size of the first token and the other information for communication to the second device is less than a size of the source data, wherein the source data comprises more than one mega bytes,
   wherein the facilitating encoding comprises encoding of the first token at the first device.

6. The non-transitory machine-readable medium of clause 1, wherein the facilitating encoding the first token comprises facilitating encoding the first token using a visual encoding technique, wherein the visual tag comprises a quick response (QR) coded version of the first token, and further comprising facilitating notifying the second device when the first device is ready to facilitate providing the display of the visual tag to enable the second device to access the visual tag, wherein the notifying comprises sending a message to the second device.

7. The non-transitory machine-readable medium of clause 1, wherein the method comprises at least one of a first security measure and a second security measure,
wherein the first security measure comprises:
facilitating receiving information identifying at least one of the second device or a user of the second device, in response to the second device attempting to access the source data; and
providing for communication, an approval following validation of the received information by a user of the first device,
wherein the second security measure comprises:
providing for communication, information identifying at least one of the second device or the user of the second device, to enable authentication of the second device or the user of the second device when the second device attempts to access the source data.

8. The non-transitory machine-readable medium of clause 1, wherein the method comprises:
facilitating transmitting the source data to a server comprising a cloud server and to send a second token to the first device;
facilitating encoding the second token to a second visual tag;
providing for access to the second visual tag by the second device to enable the second device to access the source data transmitted to the server using the second token.

9. The non-transitory machine-readable medium of clause 8, wherein the first or the second token comprises a metadata comprising at least some of an identifier of a source device, an identifier of the server, authentication information associated with the source device, authentication information associate with the server, an identifier of the source data, a path of the source data, an identifier of the source data transmitted to the server, or a path of the source data transmitted to the server, wherein the source device comprises the source data.

10. The non-transitory machine-readable medium of clause 1, wherein the source data comprises at least one of a media file, a document, remote path information, remote desktop connection information, security information, device management information, or device configuration information.

11. The non-transitory machine-readable medium of clause 10, wherein:
the media file comprises at least one of an audio file, a video file, an audio-video file, or an image,
the remote path information comprises at least one of a directory name, a folder name, a sub-folder name, or a file name,
the remote desktop connection information comprises at least one of an Internet Protocol (IP) address, a username, or a password,
the security information comprises at least one of network security information or security coding information,
the device management information comprises at least one of a color depth, a resolution, or a desktop setting, and
the device configuration comprises at least one of a network configuration, a peripheral device configuration, or a client-server configuration.

12. The non-transitory machine-readable medium of clause 1, wherein the first token is expirable and is a representation unique to one or more of the following: the source data, the second device, a user of the second device, and a time related to creation or usage of the first token, wherein the method comprises at least one of a first method and a second method,
wherein the first method comprises:
facilitating receiving a second token associated with second source data;
facilitating encoding the second token to a second visual tag; and
providing access to the second visual tag by the third device to enable the third device to access the second source data utilizing a third communication protocol,
wherein the first communication protocol is the same or different from the third communication protocol,
wherein the second token is a representation unique to one or more of the following: the second data, the third device and time related to creation or usage of the second token,
wherein the second method comprises:
facilitating receiving, at the first device, a third token associated with the source data;
facilitating encoding the third token to a third visual tag; and
providing access to the third visual tag by the fourth device to enable the fourth device to access the source data utilizing a fourth communication protocol,
wherein the first communication protocol is the same or different from the fourth communication protocol,
wherein the third token is a representation unique to one or more of the following: the source data, the third device, a user of the third device, and time related to creation or usage of the third token.

13. The non-transitory machine-readable medium of clause 1, wherein the first device is a mobile device comprising one or more displays, one or more processors, one or more network interfaces, and the non-transitory machine-readable medium, wherein a first one of the one or more network interfaces is configured to support communication based on the first communication protocol, wherein a second one of the one or more network interfaces is configured to support communication based on the second communication protocol, wherein the second device is a mobile device, wherein the camera is a built-in camera, wherein the remote device is a computing device behind a firewall, wherein the first token does not exist prior to identifying the source data to be shared, wherein the first token is creatable in real time and expirable, wherein each of the first and second communication protocols comprises one or more communication protocols.

14. A non-transitory machine-readable medium (e.g., 520, 550, FIG. 5) comprising instructions stored therein, the instructions executable by one or more processors (e.g., 530, FIG. 5) to facilitate performing a method (e.g., 700C, FIG. 7C) for facilitating sharing source data, the method comprising:
facilitating receiving a first token associated with the source data (e.g., 780, FIG. 7C);
facilitating encoding the first token to create a visual tag (e.g., 782, FIG. 7C);
providing for communication from a first device to a second device the visual tag, to enable the second device to access the source data utilizing the first token from the visual tag and utilizing a communication protocol, wherein the second device is unable to access the source data without using the first token (e.g., 784, FIG. 7C).

15. The non-transitory machine-readable medium of clause 14, wherein the method comprises identifying the source data to initiate sharing of the source data, wherein the facilitating encoding the first token comprises facilitating encoding the first token using a visual encoding technique, wherein the visual tag comprises a quick response (QR) coded version of the first token.

16. The non-transitory machine-readable medium of clause 14, wherein the source data is stored in the first device, wherein the method comprises facilitating generating the first token associated with the source data stored on the first device.

17. The non-transitory machine-readable medium of clause 14, wherein the providing for communication comprises providing for communication utilizing an electronic mail or a multimedia messaging service.

18. The non-transitory machine-readable medium of clause 14, wherein the communication protocol to be utilized by the second device comprises at least one of a peer-to-peer protocol, an interactive connectivity establishment protocol, a session initiation protocol, a Bluetooth protocol, a wireless fidelity (Wi-Fi) protocol, an extendable messaging and presence protocol (XMPP), a push protocol, or a non-industry standard communication protocol.

19. The non-transitory machine-readable medium of clause 14, wherein the facilitating encoding the first token comprises facilitating encoding the first token in a form of a uniform resource locator (URL) to allow the second device to access the source data via a website represented by the URL of the first token.

20. The non-transitory machine-readable medium of clause 14, wherein the method comprises a security measure comprising:
   facilitating receiving information identifying at least one of the second device or a user of the second device, in response to the second device attempting to access the source data;
   facilitating validating the received information by a user of the first device; and
   facilitating authenticating the second device or the user of the second device before allowing the second device to access the source data.

21. The non-transitory machine-readable medium of clause 14, wherein the providing for communication allows the second device to access the source data via a third device,
   wherein the first device supports communication between the first device and the third device to facilitate receiving the first token from the third device or to facilitate the second device to access the source data,
   wherein the first token comprises a metadata comprising one or more of an identifier of a source device, authentication information associated with the source device, an identifier of the source data, or a path of the source data, wherein the first token enables downloading the source data, wherein the source data is for at least setup, configuration, or management of one or more computers.

22. An apparatus for facilitating sharing source data (e.g., 110, FIG. 5), the apparatus comprising:
   a first network interface (e.g., 512, FIG. 5) configured to support communication based on a first communication protocol between the apparatus and a remote device (e.g., 130, FIGS. 1A-1D);
   an encoder (e.g., 558, FIG. 5) configured to facilitate receiving a first token associated with source data;
   the encoder configured to facilitate encoding the first token using a visual coding technique to generate a visual tag; and
   a display (e.g., 540, FIG. 5) configured to facilitate display of an image of the visual tag, to enable a first device located within close proximity of the apparatus to capture the image and to enable the first device to access the source data utilizing the first token from the visual tag and utilizing a second communication protocol, wherein the first device is unable to access the source data without using the first token,
   wherein the first communication protocol is the same or different from the second communication protocol,
   wherein the apparatus is a communication end-point device.

23. The apparatus of clause 22, further comprising:
   an identification module configured to identify the source data and to provide an identification information of the source data, to facilitate sharing of the source data, based on a user action at the apparatus; and
   a second network interface configured to support communication, based on the first communication protocol, from the apparatus to the remote device through a proxy server, the identification information, wherein the identification information comprises at least one of an identifier of the remote device, a path in a file system of the remote device, or a file name.

24. The apparatus of clause 22, further comprising an identification module configured to identify the source data and provide an identification information of the source data, to facilitate sharing of the source data, based on a user action at the apparatus, wherein the first network interface is further configured to support communication, based on the first communication protocol, from the apparatus to the remote device, of the identification information, wherein the identification information comprises at least one of an identifier of the remote device, a path in a file system of the remote device, or a file name.

25. The apparatus of clause 22, further comprising an identification module configured to identify the source data and to facilitate providing of an identification information of the source data, to support sharing of the source data, based on a user action at the apparatus,
   wherein the first network interface is configured to support communication for providing the identification information of the source data to the remote device to enable generation of the first token in real time in response to the communication for providing identification information of the source data,
   wherein the first network interface is further configured to facilitate receiving the first token, at the apparatus from the remote device via a proxy server, utilizing the first communication protocol, in response to the communication for providing identification information of the source data,
   wherein the apparatus comprises, a decoder to decode, prior to the facilitating encoding, the first token received utilizing the first communication protocol,
   wherein the encoder is configured to facilitate encoding the first token using a visual coding technique comprising a quick response (QR) coding,
   wherein the first token comprises other information for accessing the source data, wherein the other information comprises location of the source data, wherein a size of the first token and the other information included in the first token is less than a size of the source data, wherein the source data comprises more than one mega bytes, wherein the encoder is further configured to encode the first token at the apparatus.

26. The apparatus of clause 22, further comprising a security module configured to facilitate at least one of a first security measure and a second security measure, wherein the first security measure comprises:
facilitating receiving information identifying at least one of the first device or a user of the first device, in response to the first device attempting to access the source data; and
providing for communication, an approval following validation of the received information by a user of the apparatus, wherein the second security measure comprises:
providing for communication, information identifying at least one of the first device or the user of the first device, to enable authentication of the first device or the user of the first device when the first device attempts to access the source data.

27. The apparatus of clause 22, wherein the first network interface is further configured to facilitate providing a request, directed to the remote device, to transmit the source data to a server comprising a cloud server and to send a second token to the apparatus, and wherein the encoder is further configured to facilitate encoding the second token using the visual coding technique to generate a second visual tag and facilitating display of the second visual tag to enable the first device to access the source data transmitted to the server.

28. The apparatus of clause 27, wherein the first or the second token comprises a metadata comprising at least some of an identifier of the remote device, an identifier of the server, authentication information associated with the remote device, authentication information associate with the server, an identifier of the source data stored in the remote device, a path of the source data stored in the remote device, an identifier of the source data transmitted to the server, or a path of the source data transmitted to the server.

29. The apparatus of clause 22, wherein the first token is expirable and is a representation unique to one or more of the following: the source data, the first device, a user of the first device, and time related to creation or usage of the first token, and wherein the apparatus is configured to support a plurality of first devices, by providing for receiving from the remote device a plurality of first tokens, and facilitating providing for display of a plurality of visual tags each visual tag of the plurality of visual tags encoding a first token of the plurality of first tokens and each token of the plurality of first tokens to enable one of the plurality of the first devices to access a respective visual tag of the plurality of visual tags and use the respective first token to access the source data, wherein each first token of the plurality of first tokens is a representation unique to one or more of the following: the source data, the one of the plurality of the first devices, a user of the one of the plurality of the first devices, and a time related to creation or usage of the token of the plurality of first tokens.

30. An apparatus (e.g., 110, FIG. 5) for facilitating sharing source data, comprising:
a processor (e.g., 530, FIG. 5) operable to facilitate receiving a first token associated with the source data;
the processor (e.g., 530, FIG. 5) operable to facilitate encoding the first token to create a visual tag;
the processor (e.g., 530, FIG. 5) operable to provide for communication from a first device to a second device (e.g., 120, FIG. 6) the visual tag, to enable the second device to access the source data utilizing the first token from the visual tag and utilizing a communication protocol,
wherein the second device is unable to access the source data without using the first token, wherein the first device comprises the apparatus.

31. The apparatus of clause 30, wherein the processor is operable to facilitate identifying the source data to initiate sharing of the source data.

32. The apparatus of clause 30, wherein the source data is stored in the first device, wherein the processor is operable to facilitate generating the first token associated with the source data stored on the first device.

33. The apparatus of clause 30, wherein the processor is operable to provide for communication to the second device, the visual tag, utilizing an electronic mail or a multimedia messaging service.

34. The apparatus of clause 30, wherein the processor is operable to facilitate encoding the first token in a form of a uniform resource locator (URL) to allow the second device to access the source data via a website represented by the URL of the first token.

35. The apparatus of clause 30, wherein the processor is operable to provide for communication to the second device the visual tag to allow the second device to access the source data via a third device,
wherein the first device supports communication between the first device and the third device to facilitate receiving the first token from the third device or to facilitate the second device to access the source data.

36. A method for facilitating sharing source data (e.g., 700A, FIG. 7A), comprising:
supporting communication based on a first communication protocol between a first device and a third device, wherein the communication is associated with source data (e.g., 710, FIG. 7A);
facilitating receiving a first token associated with the source data (e.g., 720, FIG. 7A);
facilitating encoding the first token to create a visual tag (e.g., 730, FIG. 7A);
providing for display the visual tag, to enable a second device to optically capture the visual tag utilizing a camera and to allow the second device to access the source data utilizing the first token from the visual tag and utilizing a second communication protocol, wherein the second device is unable to access the source data without using the first token (e.g., 740, FIG. 7A),
wherein the first communication protocol is the same or different from the second communication protocol,
wherein the first device is a communication end point device.

37. The method of clause 36, comprising identifying the source data based on a user action at the first device.

38. The method of clause 36, wherein the method comprises identifying, at the first device, the source data for sharing, wherein the supporting communication comprises providing for communication, from the first device utilizing the first communication protocol to the third device through a proxy server, identification information of the source data based on the identifying the source data, wherein the facilitating encoding the first token comprises facilitating encoding the first token using a visual encoding technique, wherein the visual tag comprises a quick response (QR) coded version of the first token.

39. The method of clause 36, wherein the method comprises identifying the source data for sharing, wherein the supporting communication comprises providing for communication, to the third device, identification information of the source data, wherein the identification information comprises at least one of an identifier of the third device, a path in a file system of the third device, or a file name, wherein the supporting communication comprises providing for communication, to the third device, a request for the first token, wherein the facilitating receiving comprises facilitating receiving the first token in response to the request.

40. The method of clause 36, wherein the facilitating encoding the first token comprises facilitating encoding the first token using a visual encoding technique, wherein the visual tag comprises a quick response (QR) coded version of the first token, and further comprising facilitating notifying the second device when the first device is ready to facilitate providing the display of the visual tag to enable the second device to access the visual tag, wherein the notifying comprises sending a message to the second device.

41. The method of clause 36, wherein the method comprises at least one of a first security measure and a second security measure,
wherein the first security measure comprises:
facilitating receiving information identifying at least one of the second device or a user of the second device, in response to the second device attempting to access the source data; and
providing for communication, an approval following validation of the received information by a user of the first device,
wherein the second security measure comprises:
providing for communication, information identifying at least one of the second device or the user of the second device, to enable authentication of the second device or the user of the second device when the second device attempts to access the source data.

42. The method of clause 36, wherein the method comprises:
facilitating transmitting the source data to a server comprising a cloud server and to send a second token to the first device;
facilitating encoding the second token to a second visual tag;
providing for access to the second visual tag by the second device to enable the second device to access the source data transmitted to the server using the second token.

43. The method of clause 36, wherein the source data comprises at least one of a media file, a document, remote path information, remote desktop connection information, security information, device management information, or device configuration information.

44. A method for facilitating sharing source data, the method comprising:
facilitating receiving a first token associated with the source data;
facilitating encoding the first token to create a visual tag;
providing for communication from a first device to a second device the visual tag, to enable the second device to access the source data utilizing the first token from the visual tag and utilizing a communication protocol, wherein the second device is unable to access the source data without using the first token.

45. The method of clause 44, wherein the method comprises identifying the source data to initiate sharing of the source data.

46. The method of clause 44, wherein the source data is stored in the first device, wherein the method comprises facilitating generating the first token associated with the source data stored on the first device.

47. The method of clause 44, wherein the providing for communication comprises providing for communication utilizing an electronic mail or a multimedia messaging service.

48. The method of clause 44, wherein the communication protocol to be utilized by the second device comprises at least one of a peer-to-peer protocol, an interactive connectivity establishment protocol, a session initiation protocol, a near field communication protocol, a Bluetooth protocol, a wireless fidelity (Wi-Fi) protocol, an extendable messaging and presence protocol (XMPP), a push protocol, or a non-industry standard communication protocol.

49. The method of clause 44, wherein the facilitating encoding the first token comprises facilitating encoding the first token in a form of a uniform resource locator (URL) to allow the second device to access the source data via a website represented by the URL of the first token.

50. The method of clause 44, wherein the providing for communication allows the second device to access the source data via a third device,
wherein the first device supports communication between the first device and the third device to facilitate receiving the first token from the third device or to facilitate the second device to access the source data.

Figure 11:
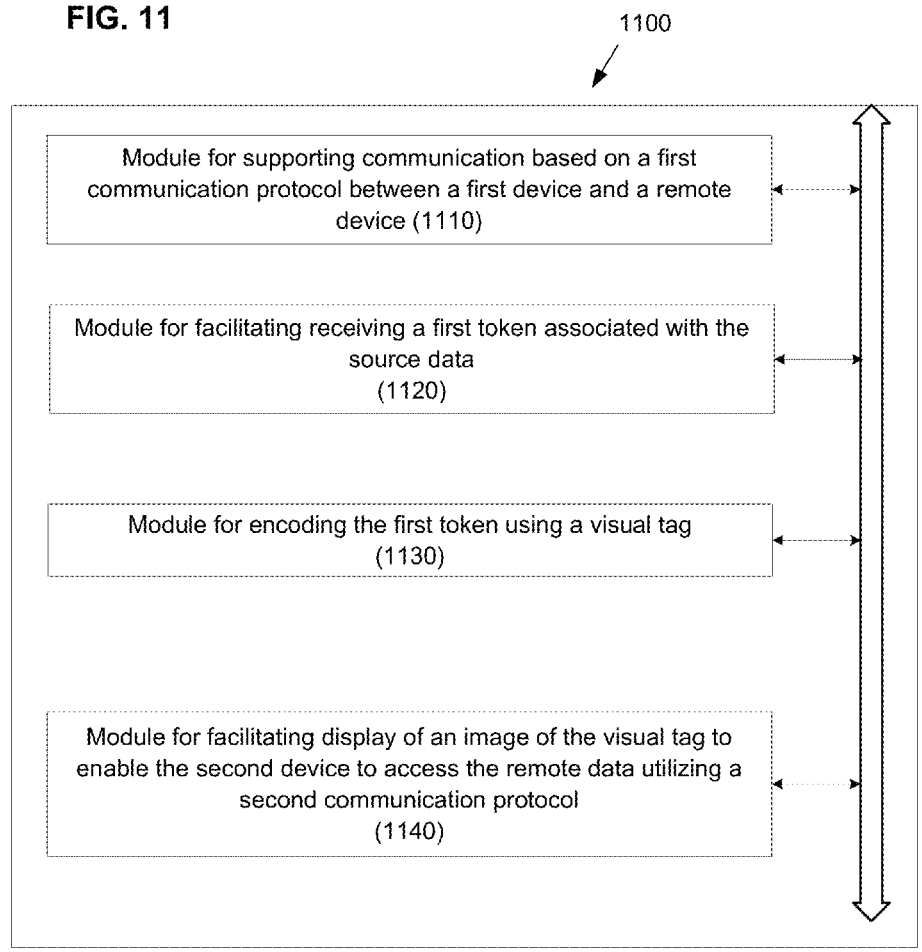
FIGS. 11-14 are block diagrams representing examples of apparatuses for sharing information using a visual tag.
Figure 13:
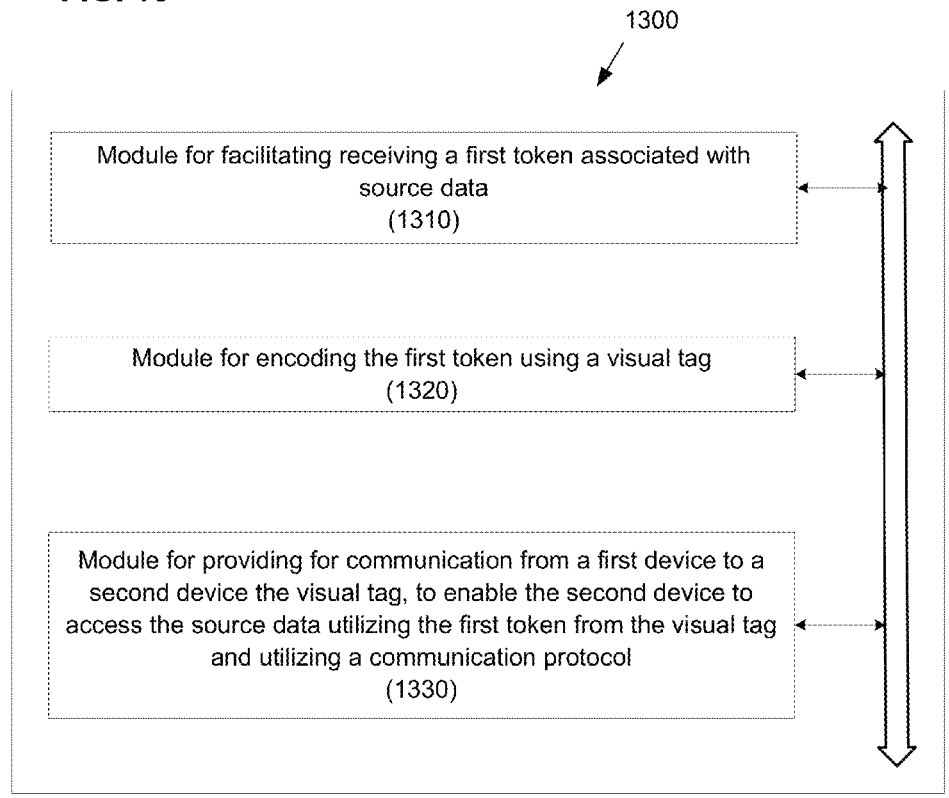

51. An apparatus for facilitating sharing source data (e.g., 1100, FIG. 11), the apparatus comprising:
means for supporting communication based on a first communication protocol between a first device and a remote device, wherein the communication is associated with source data (e.g., 1110, FIG. 11);
means for facilitating receiving a first token associated with the source data (e.g., 1120, FIG. 11);
means for facilitating encoding the first token to create a visual tag (e.g., 1130, FIG. 11);
means for providing for display the visual tag, to enable a second device to optically capture the visual tag utilizing a camera and to allow the second device to access the source data utilizing the first token from the visual tag and utilizing a second communication protocol, wherein the second device is unable to access the source data without using the first token (e.g., 1140, FIG. 11),
wherein the first communication protocol is the same or different from the second communication protocol, 52. An apparatus for facilitating sharing source data (e.g., 1300, FIG. 13), the apparatus comprising:
means for facilitating receiving a first token associated with the source data (e.g., 1310, FIG. 13);
means for facilitating encoding the first token to create a visual tag (e.g., 1320, FIG. 13);
means for providing for communication from a first device to a second device the visual tag, to enable the second device to access the source data utilizing the first token from the visual tag and utilizing a communication protocol, wherein the second device is unable to access the source data without using the first token (e.g., 1330, FIG. 13).

53. A hardware apparatus comprising means adapted for performing a method associated with any one of the foregoing clauses.

54. An apparatus comprising means for performing a method associated with any one of the foregoing clauses.

55. An apparatus comprising one or more processors configured to perform a method associated with any one of the foregoing clauses.

56. An apparatus comprising one or more processors and a machine-readable medium, the machine-readable medium comprising instructions executable by one or more processors to perform a method associated with any one of the foregoing clauses.

Examples of Decoding Clauses

1. A non-transitory machine-readable medium (e.g., 620, 650, FIG. 6) comprising instructions stored therein, the instructions executable by one or more processors (e.g., 630, FIG. 6) to facilitate performing a method (e.g., 700B, FIG. 7B) for facilitating sharing source data, the method comprising:

facilitating optically capturing, by an optical device of a first device, an image of a visual tag from a second device, wherein the visual tag of the second device is located within close proximity of the optical device of the first device, wherein the visual tag comprises a visually encoded first token associated with the source data, wherein the first token is a non-public token, wherein the first token is based on the source data for sharing (e.g., 750, FIG. 7B);

facilitating decoding the visual tag to retrieve the first token (e.g., 760, FIG. 7B);

providing for communication based on a first communication protocol to a third device to download the source data using the retrieved first token (e.g., 770, FIG. 7B), wherein the second device is adapted to provide display of the visual tag.

2. The non-transitory machine-readable medium of clause 1, wherein the method comprises facilitating accessing the source data by the first device, after a time period to allow the third device to receive from the second device an approval by a user of the second device for the access of the source data.

3. The non-transitory machine-readable medium of clause 2, wherein the method comprises:

facilitating capturing of an image of a visually encoded second token associated with the source data from the second device located within close proximity of the first device;

facilitating decoding the visually encoded second token to retrieve the second token; and providing for communication based on a second communication protocol to a server comprising a cloud server to download the source data using the retrieved second token, after the source data is transmitted to the server from the third device, in response to a request from the second device.

4. The non-transitory machine-readable medium of clause 1, wherein the source data comprises at least one of a media file, a document, remote path information, remote desktop connection information, security information, device management information, or device configuration information.

5. The non-transitory machine-readable medium of clause 1, wherein the facilitating decoding the visual tag comprises facilitating decoding the visual tag encoded using quick response (QR) code, further comprising supporting receiving of a notification from the second device, the notification notifying the first device that the second device is ready to facilitate providing an image of the visual tag, wherein the supporting receiving of a notification comprises supporting receiving a message including a text message from the second device.

6. The non-transitory machine-readable medium of clause 3, wherein the first token or the second token comprises a metadata comprising one or more of an identifier of a source device, an identifier of the server, authentication information associated with the source device, authentication information associate with the server, an identifier of the source data, a path of the source data, an identifier of the source data transmitted to the server, or a path of the source data transmitted to the server, wherein the first token and the second token are expirable and are representations unique to one or more of the following: the source data, the second device, a user of the second device, and time related to creation or usage of the first token or the second token, wherein the source device contains the source data.

7. The non-transitory machine-readable medium of clause 3, wherein the method comprises:

providing for communication based on the first communication protocol to the third device to download the source data within a time period prior to an expiration of the first token; and providing for communication based on the second communication protocol to the server to download the source data within a time period prior to an expiration of the second token.

8. The non-transitory machine-readable medium of clause 3, wherein the first device is a mobile device comprising one or more displays, a built-in camera, one or more processors, one or more network interfaces, and the non-transitory machine-readable medium, wherein a first one of the one or more network interfaces is configured to support communication based on the first communication protocol, wherein a second one of the one or more network interfaces is configured to support communication based on the second communication protocol, wherein the second device is a mobile device, wherein the third device is a computing device behind a firewall, wherein the first token and the second token do not exist prior to identifying the source data to be shared, wherein the first token and the second token are creatable in real time and are expirable, wherein each of the first and second communication protocols comprises one or more communication protocols.

Figures 7C, 7D:
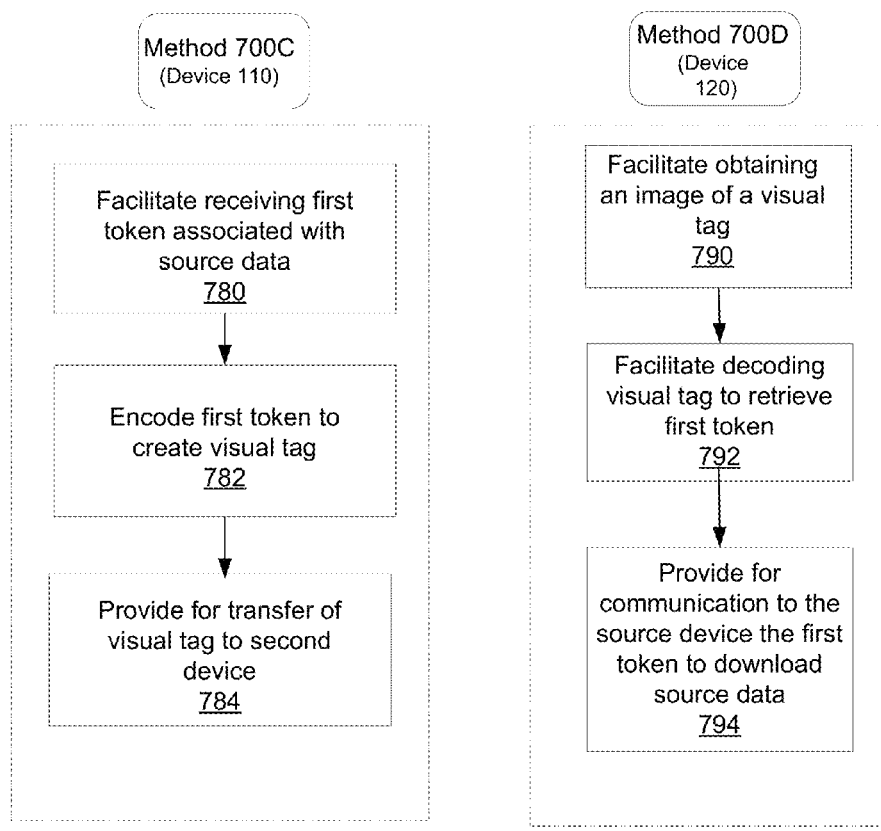

9. A non-transitory machine-readable medium (e.g., 620, 650, FIG. 6) comprising instructions stored therein, the instructions executable by one or more processors (e.g., 630, FIG. 6) to facilitate performing a method for facilitating sharing source data (e.g., 700D, FIG. 7D), the method comprising:

facilitating obtaining an image of a visual tag from a first device, wherein the visual tag comprises a visually encoded first token associated with the source data, wherein the first token is a non-public token (e.g., 790, FIG. 7D);

facilitating decoding the visual tag to retrieve the first token (e.g., 792, FIG. 7D);

providing for communication based on a first communication protocol to a second device to download the source data using the retrieved first token (e.g., 794, FIG. 7D).

10. The non-transitory machine-readable medium of clause 9, wherein the second device is a remote device, wherein the source data is stored in the remote device.

11. The non-transitory machine-readable medium of clause 9, wherein the source data is stored in the first device, wherein the visual tag comprises a quick response (QR) code.

12. The non-transitory machine-readable medium of clause 9, wherein the retrieved first token comprises a uniform resource locator (URL), wherein the providing for communication comprises facilitating opening the URL on a web browser to allow a determination as to whether the a device comprising the non-transitory machine-readable medium is enabled to facilitate downloading the source data using the retrieved first token.

13. The non-transitory machine-readable medium of clause 12,
   wherein if the device is enabled to facilitate downloading, then the method comprises facilitating downloading the source data based on the retrieved first token,
   wherein if the device is not enabled to facilitate downloading, then the method comprises providing for communication to the second device a request to download the source data and facilitating receiving the source data based on the request.

14. The non-transitory machine-readable medium of clause 9, wherein the retrieved first token comprises a uniform resource locator (URL), wherein the URL comprises an identifier of a device storing the source data, a path of the source data stored in the device, and authentication information.

15. The non-transitory machine-readable medium of clause 9, wherein the first communication protocol comprises at least one of a peer-to-peer protocol, an interactive connectivity establishment protocol, a session initiation protocol, a near field communication protocol, a Bluetooth protocol, a wireless fidelity (Wi-Fi) protocol, an extendable messaging and presence protocol (XMPP), a push protocol, or a non-industry standard communication protocol.

16. An apparatus for facilitating sharing source data (e.g., 120, FIG. 6), the apparatus comprising:
   a camera (e.g., 610, FIG. 6) configured to facilitate capturing an image of a visual tag representing a first token associated with the source data from a display of a first device (e.g., 110, FIG. 5), located within close proximity of the camera, wherein the first token is a non-public token, wherein the first token is based on the source data for sharing;
   a decoder (e.g., 656, FIG. 6) configured to facilitate decoding the visual tag to retrieve the first token;
   a network interface (e.g., 612 or 614, FIG. 6) configured to provide for communication based on a first communication protocol to a remote device to download the source data using the retrieved first token,
   wherein the display (e.g., 640, FIG. 6) of the first device is enabled to display the image of the visual tag to be captured by the camera.

17. The apparatus of clause 16, further comprising a download manager configured to facilitate accessing the source data by the apparatus, after a time period to allow the remote device to receive from the first device an approval by a user of the first device for the access of the source data.

18. The apparatus of clause 16, wherein the camera is a built-in camera, wherein the camera is further configured to facilitate capturing an image of a second visual tag representing a second token associated with the source data from the first device located within a close proximity of the apparatus, wherein the decoder is further configured to facilitate decoding the visual tag to retrieve the second token; and further comprising a second network interface configured to provide for communication based on a second communication protocol to a server comprising a cloud server to download the source data using the decoded second token, after the source data is transmitted to the server from the remote device, in response to a request from the first device.

19. The apparatus of clause 16, wherein the source data comprises at least one of a media file, a document, remote path information, remote desktop connection information, security information, device management information, or device configuration information.

20. The apparatus of clause 16, wherein the first token comprises a metadata comprising one or more of the following: an identifier of the remote device, authentication information associated with the remote device, an identifier of the source data, or a path of the source data, wherein the first token is expirable and is a representation unique to one or more of the following: the source data, the first device, a user of the first device, and a time related to creation or usage of the first token.

21. The apparatus of clause 18, wherein:
   the first network interface is further configured to provide for communication based on the first communication protocol to the remote device to download the source data within a time period prior to an expiration of the first token; and
   the second network interface is further configured to provide for communication based on the second communication protocol to the server to download the source data within a time period prior to an expiration of the second token.

22. An apparatus (e.g., 120, FIG. 6) for facilitating sharing source data, comprising:
   a processor (e.g., 630, FIG. 6) operable to facilitate obtaining an image of a visual tag from a first device (e.g., 110, FIG. 5), wherein the visual tag comprises a visually encoded first token associated with the source data, wherein the first token is a non-public token;
   the processor (e.g., 630, FIG. 6) operable to facilitate decoding the visual tag to retrieve the first token;
   the processor (e.g., 630, FIG. 6) operable to provide for communication based on a first communication protocol to a second device to download the source data using the retrieved first token.

23. The apparatus of clause 22, wherein the second device is a remote device, wherein the source data is stored in the remote device, wherein the visual tag comprises a quick response (QR) code.

24. The apparatus of clause 22, wherein the source data is stored in the first device.

25. The apparatus of clause 22, wherein the retrieved first token comprises a uniform resource locator (URL), wherein the processor is operable to facilitate opening the URL on a web browser to allow a determination as to whether the apparatus is enabled to facilitate downloading the source data using the retrieved first token.

26. The apparatus of clause 25,
   wherein if the apparatus is enabled to facilitate downloading, then the processor is operable to facilitate downloading the source data based on the retrieved first token,
   wherein if the apparatus is not enabled to facilitate downloading, then the processor is operable to provide for communication to the second device a request to download the source data and to facilitate receiving the source data based on the request.

27. The apparatus of clause 22, wherein the retrieved first token comprises a uniform resource locator (URL), wherein the URL comprises an identifier of a device storing the source data, a path of the source data stored in the device, and authentication information.

28. A method for facilitating sharing source data (e.g., 700B, FIG. 7B), comprising:
   facilitating optically capturing, by an optical device of a first device, an image of a visual tag from a second device, wherein the visual tag of the second device is located within close proximity of the optical device of the first device, wherein the visual tag comprises a visually encoded first token associated with the source data, wherein the first token is a non-public token, wherein the first token is based on the source data for sharing (e.g., 750, FIG. 7B);

facilitating decoding the visual tag to retrieve the first token (e.g., 760, FIG. 7B);

providing for communication based on a first communication protocol to a third device to download the source data using the retrieved first token (e.g., 770, FIG. 7B), wherein the second device is adapted to provide display of the visual tag.

29. The method of clause 28, wherein the method comprises facilitating accessing the source data by the first device, after a time period to allow the third device to receive from the second device an approval by a user of the second device for the access of the source data.

30. The method of clause 29, wherein the method comprises:

facilitating capturing of an image of a visually encoded second token associated with the source data from the second device located within close proximity of the first device;

facilitating decoding the visually encoded second token to retrieve the second token; and providing for communication based on a second communication protocol to a server comprising a cloud server to download the source data using the retrieved second token, after the source data is transmitted to the server from the third device, in response to a request from the second device.

31. The method of clause 28, wherein the source data comprises at least one of a media file, a document, remote path information, remote desktop connection information, security information, device management information, or device configuration information.

32. The method of clause 28, wherein the facilitating decoding the visual tag comprises facilitating decoding the visual tag encoded using quick response (QR) code, further comprising supporting receiving of a notification from the second device, the notification notifying the first device that the second device is ready to facilitate providing an image of the visual tag, wherein the supporting receiving of a notification comprises supporting receiving a message including a text message from the second device.

33. The method of clause 30, wherein the first token or the second token comprises a metadata comprising one or more of an identifier of a source device, an identifier of the server, authentication information associated with the source device, authentication information associate with the server, an identifier of the source data, a path of the source data, an identifier of the source data transmitted to the server, or a path of the source data transmitted to the server, wherein the first token and the second token are expirable and are representations unique to one or more of the following: the source data, the second device, a user of the second device, and time related to creation or usage of the first token or the second token, wherein the source device contains the source data.

34. The method of clause 30, wherein the method comprises:

providing for communication based on the first communication protocol to the third device to download the source data within a time period prior to an expiration of the first token; and providing for communication based on the second communication protocol to the server to download the source data within a time period prior to an expiration of the second token.

35. A method for facilitating sharing source data (e.g., 700D, FIG. 7D), comprising:

facilitating obtaining an image of a visual tag from a first device, wherein the visual tag comprises a visually encoded first token associated with the source data, wherein the first token is a non-public token (e.g., 790, FIG. 7D);

facilitating decoding the visual tag to retrieve the first token (e.g., 792, FIG. 7D);

providing for communication based on a first communication protocol to a second device to download the source data using the retrieved first token (e.g., 794, FIG. 7D).

36. The method of clause 35, wherein the second device is a remote device, wherein the source data is stored in the remote device.

37. The method of clause 35, wherein the source data is stored in the first device.

38. The method of clause 35, wherein the retrieved first token comprises a uniform resource locator (URL), wherein the providing for communication comprises facilitating opening the URL on a web browser to allow a determination as to whether the a device operable to provide for communication to the second device is enabled to facilitate downloading the source data using the retrieved first token.

39. The method of clause 38, wherein if the device is enabled to facilitate downloading, then the method comprises facilitating downloading the source data based on the retrieved first token, wherein if the device is not enabled to facilitate downloading, then the method comprises providing for communication to the second device a request to download the source data and facilitating receiving the source data based on the request.

40. The method of clause 35, wherein the retrieved first token comprises a uniform resource locator (URL), wherein the URL comprises an identifier of a device storing the source data, a path of the source data stored in the device, and authentication information.

41. The method of clause 35, wherein the first communication protocol comprises at least one of a peer-to-peer protocol, an interactive connectivity establishment protocol, a session initiation protocol, a near field communication protocol, a Bluetooth protocol, a wireless fidelity (Wi-Fi) protocol, an extendable messaging and presence protocol (XMPP), a push protocol, or a non-industry standard communication protocol.

Figure 12:
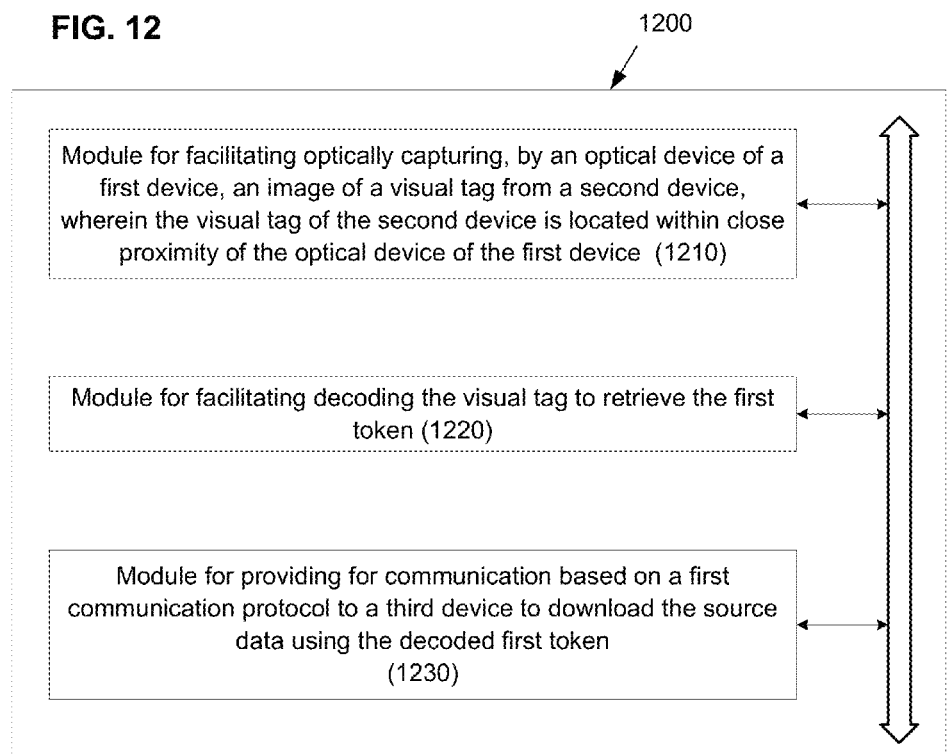

42. An apparatus for facilitating sharing source data (e.g., 1200, FIG. 12), the apparatus comprising:

means for facilitating optically capturing, by an optical device of a first device, an image of a visual tag from a second device, wherein the visual tag of the second device is located within close proximity of the optical device of the first device, wherein the visual tag comprises a visually encoded first token associated with the source data, wherein the first token is a non-public token, wherein the first token is based on the source data for sharing (e.g., 1210, FIG. 12); means for facilitating decoding the visual tag to retrieve the first token (e.g., 1220, FIG. 12);

means for providing for communication based on a first communication protocol to a third device to download the source data using the retrieved first token (e.g., 1230, FIG. 12), wherein the second device is adapted to provide display of the visual tag.

Figure 14:
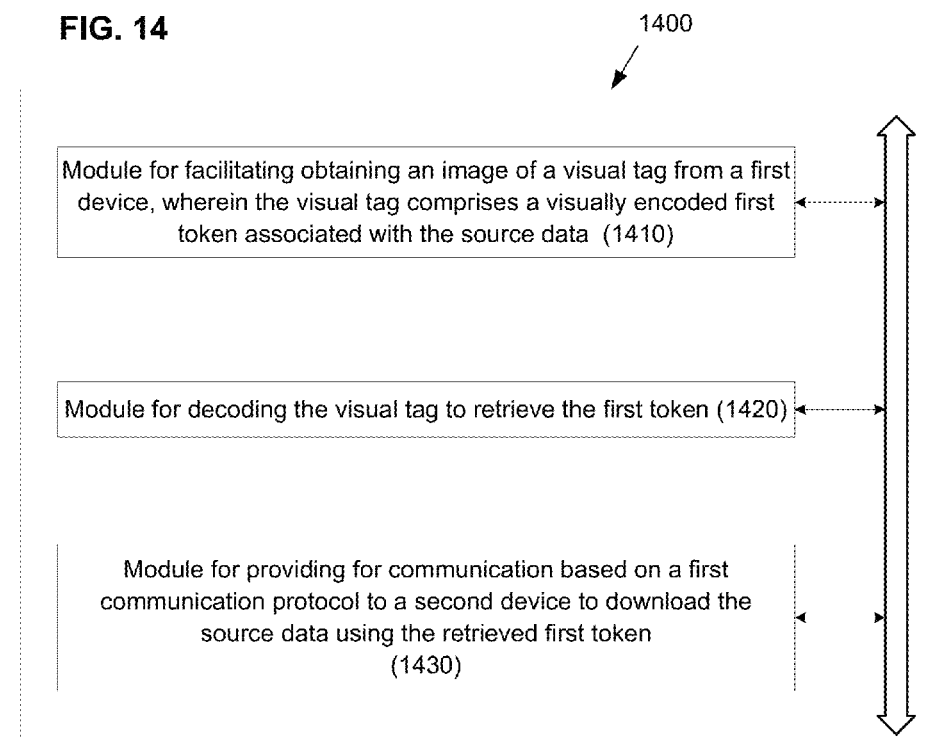

43. An apparatus for facilitating sharing source data (e.g., 1400, FIG. 14), the apparatus comprising:

means for facilitating obtaining an image of a visual tag from a first device, wherein the visual tag comprises a visually encoded first token associated with the source data, wherein the first token is a non-public token (e.g., 1410, FIG. 14);

means for facilitating decoding the visual tag to retrieve the first token (e.g., 1420, FIG. 14);

means for providing for communication based on a first communication protocol to a second device to download the source data using the retrieved first token (e.g., 1430, FIG. 14).

44. A hardware apparatus comprising means adapted for performing a method associated with any one of the foregoing clauses.

45. An apparatus comprising means for performing a method associated with any one of the foregoing clauses.

46. An apparatus comprising one or more processors configured to perform a method associated with any one of the foregoing clauses.

47. An apparatus comprising one or more processors and a machine-readable medium, the machine-readable medium comprising instructions executable by one or more processors to perform a method associated with any one of the foregoing clauses.

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means—for elements (e.g., means for performing an action) such that each means—for element can be represented as a module for element (e.g., a module for performing an action).

Those of skill in the art would appreciate that items such as the various illustrative blocks, modules, elements, components, methods, operations, steps, and algorithms described herein (e.g., components of, or operations on, client 102 or server 104/304) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.). Those skilled in the art will recognize how to implement the instructions, circuits, and processing systems.

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect of the disclosure, when actions or functions are described as being performed by an item (e.g., modifying, intercepting, redirecting, determining, obtaining, creating, operating, deleting, removing, receiving, providing, generating, converting, displaying, notifying, accepting, selecting, controlling, transmitting, reporting, sending, or any other action or function), it is understood that such actions or functions may be performed by the item directly or indirectly. In one aspect, when a module is described as performing an action, the module may be understood to perform the action directly. In one aspect, when a module is described as performing an action, the module may be understood to perform the action indirectly, for example, by facilitating, enabling or causing such an action.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed are an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A non-transitory machine-readable medium comprising instructions stored therein, the instructions executable by one or more processors to perform a method for sharing source data, the method comprising:
    identifying, at the first device, the source data for sharing;
    communicating based on a first communication protocol between a first device and a remote device through a proxy server, wherein the communication is associated with identification information of the identified source data;
    receiving, by the first device, a first token associated with the source data;
    encoding, by the first device, the first token to create a visual tag using a visual encoding technique, wherein the visual tag comprises a quick response (QR) coded version of the first token; and
    displaying the visual tag on the first device, to enable a second device to optically capture the visual tag utilizing a camera and to allow the second device to access the source data utilizing the first token from the visual tag and utilizing a second communication protocol, wherein the second device is unable to access the source data without using the first token,
    wherein the first communication protocol is the same or different from the second communication protocol,
    wherein the first device is a communication end point device.

2. The non-transitory machine-readable medium of claim 1, wherein the identifying the source data is based on a user action at the first device.

3. The non-transitory machine-readable medium of claim 1, wherein the method comprises identifying the source data for sharing,
    wherein the communicating comprises communicating, to the remote device, identification information of the source data, wherein the identification information comprises at least one of an identifier of a source device, a path in a file system of the source device, or a file name,
wherein the communicating comprises communicating, to the remote device, a request for the first token,
wherein the receiving comprises receiving the first token in response to the request,
wherein the source device contains the source data.

4. The non-transitory machine-readable medium of claim 1,
wherein the communicating comprises providing identification information of the source data to the remote device to enable generation of the first token in real time in response to the providing identification information of the source data,
wherein the receiving the first token comprises receiving the first token, at the first device, utilizing the first communication protocol, from the remote device via a proxy server, in response to the providing identification information of the source data,
wherein the method comprises, prior to the encoding, decoding the first token received utilizing the first communication protocol,
wherein the communicating to the second device the first token comprises communicating, from the first device to the second device, the first token,
wherein the method comprises communicating, from the first device to the second device, other information for accessing the source data, wherein the other information comprises location of the source data, wherein a size of the first token and the other information for communication to the second device is less than a size of the source data, wherein the source data comprises more than one mega bytes,
wherein the encoding comprises encoding of the first token at the first device.

5. The non-transitory machine-readable medium of claim 1, wherein the encoding the first token comprises notifying the second device when the first device is ready to display the visual tag to enable the second device to access the visual tag, wherein the notifying comprises sending a message to the second device.

6. The non-transitory machine-readable medium of claim 1, wherein the method comprises at least one of a first security measure and a second security measure,
wherein the first security measure comprises:
receiving information identifying at least one of the second device or a user of the second device, in response to the second device attempting to access the source data; and
communicating, an approval following validation of the received information by a user of the first device,
wherein the second security measure comprises:
communicating, information identifying at least one of the second device or the user of the second device, to enable authentication of the second device or the user of the second device when the second device attempts to access the source data.

7. The non-transitory machine-readable medium of claim 1, wherein the method comprises:
transmitting the source data to a server comprising a cloud server and to send a second token to the first device;
encoding the second token to a second visual tag;
accessing the second visual tag by the second device to enable the second device to access the source data transmitted to the server using the second token.

8. The non-transitory machine-readable medium of claim 7, wherein the first or the second token comprises a metadata comprising at least some of an identifier of a source device, an identifier of the server, authentication information associated with the source device, authentication information associate with the server, an identifier of the source data, a path of the source data, an identifier of the source data transmitted to the server, or a path of the source data transmitted to the server, wherein the source device comprises the source data.

9. The non-transitory machine-readable medium of claim 1, wherein the source data comprises at least one of a media file, a document, remote path information, remote desktop connection information, security information, device management information, or device configuration information.

10. The non-transitory machine-readable medium of claim 9, wherein:
the media file comprises at least one of an audio file, a video file, an audio-video file, or an Image,
the remote path information comprises at least one of a directory name, a folder name, a sub-folder name, or a file name,
the remote desktop connection information comprises at least one of an Internet Protocol (IP) address, a username, or a password,
the security information comprises at least one of network security information or security coding information,
the device management information comprises at least one of a color depth, a resolution, or a desktop setting, and
the device configuration comprises at least one of a network configuration, a peripheral device configuration, or a client-server configuration.

11. The non-transitory machine-readable medium of claim 1, wherein the first token is expirable and is a representation unique to one or more of the following: the source data, the second device, a user of the second device, and a time related to creation or usage of the first token, wherein the method comprises at least one of a first method and a second method,
wherein the first method comprises:
receiving a second token associated with second source data;
encoding the second token to a second visual tag; and
accessing the second visual tag by the third device to enable the third device to access the second source data utilizing a third communication protocol,
wherein the first communication protocol is the same or different from the third communication protocol,
wherein the second token is a representation unique to one or more of the following: the second data, the third device and time related to creation or usage of the second token,
wherein the second method comprises:
receiving, at the first device, a third token associated with the source data;
encoding the third token to a third visual tag; and
accessing the third visual tag by the fourth device to enable the fourth device to access the source data utilizing a fourth communication protocol,
wherein the first communication protocol is the same or different from the fourth communication protocol,
wherein the third token is a representation unique to one or more of the following: the source data, the third device, a user of the third device, and time related to creation or usage of the third token.

12. The non-transitory machine-readable medium of claim 1, wherein the first device is a mobile device comprising one or more displays, one or more processors, one or more network interfaces, and the non-transitory machine-readable medium, wherein a first one of the one or more network interfaces is configured to support communication based on the first communication protocol, wherein a second one of the one or more network interfaces is configured to support communication based on the second communication protocol, wherein the second device is a mobile device, wherein the camera is a built-in camera, wherein the remote device is a computing device behind a firewall, wherein the first token does not exist prior to identifying the source data to be shared, wherein the first token is creatable in real time and expirable, wherein each of the first and second communication protocols comprises one or more communication protocols.

13. A non-transitory machine-readable medium comprising instructions stored therein, the instructions executable by one or more processors to perform a method for sharing source data, the method comprising:
  receiving, by a first device, a first token associated with the source data;
  encoding, by the first device, the first token to create a visual tag;
  communicating, from the first device to a second device the visual tag, to enable the second device to access the source data utilizing the first token from the visual tag and utilizing a communication protocol, wherein the second device is unable to access the source data without using the first token;
  receiving information identifying at least one of the second device or a user of the second device, in response to the second device attempting to access the source data; and
  validating the received information by a user of the first device; and authenticating the second device or the user of the second device before allowing the second device to access the source data.

14. The non-transitory machine-readable medium of claim 13, wherein the method comprises identifying the source data to initiate sharing of the source data, wherein the encoding the first token comprises encoding the first token using a visual encoding technique, wherein the visual tag comprises a quick response (QR) coded version of the first token.

15. The non-transitory machine-readable medium of claim 13, wherein the source data is stored in the first device, wherein the method comprises generating the first token associated with the source data stored on the first device.

16. The non-transitory machine-readable medium of claim 13, wherein the communicating comprises communicating utilizing an electronic mail or a multimedia messaging service.

17. The non-transitory machine-readable medium of claim 13, wherein the communication protocol to be utilized by the second device comprises at least one of a peer-to-peer protocol, an interactive connectivity establishment protocol, a session initiation protocol, a bluetooth protocol, a wireless fidelity (WiFi) protocol, an extendable messaging and presence protocol (XMPP), a push protocol, or a non-industry standard communication protocol.

18. The non-transitory machine-readable medium of claim 13, wherein the encoding the first token comprises encoding the first token in a form of a uniform resource locator (URL) to allow the second device to access the source data via a website represented by the URL of the first token.

19. The non-transitory machine-readable medium of claim 13, wherein the communicating allows the second device to access the source data via a third device,
  wherein the first device supports communication between the first device and the third device to receive the first token from the third device or to enable the second device to access the source data,
  wherein the first token comprises a metadata comprising one or more of an identifier of a source device, authentication information associated with the source device, an identifier of the source data, or a path of the source data, wherein the first token enables downloading the source data, wherein the source data is for at least setup, configuration, or management of one or more computers.

20. An apparatus for sharing source data, the apparatus comprising:
  an identification module configured to identify a source data and to provide an identification information of the source data, to share of the source data, based on a user action at the apparatus;
  a first network interface configured to support communication based on a first communication protocol between the apparatus and a remote device;
  a second network interface configured to support communication, based on the first communication protocol, from the apparatus to the remote device through a proxy server, the identification information, wherein the identification information comprises at least one of an identifier of the remote device, a path in a file system of the remote device, or a file name;
  an encoder configured to receive, from the remote device, a first token associated with source data;
  the encoder configured to encode the first token using a visual coding technique to generate a visual tag; and
  a display configured to display of an image of the visual tag, to enable a first device located within close proximity of the apparatus to capture the image and to enable the first device to access the source data utilizing the first token from the visual tag and utilizing a second communication protocol, wherein the first device is unable to access the source data without using the first token,
  wherein the first communication protocol is the same or different from the second communication protocol,
  wherein the apparatus is a communication end-point device.

21. The apparatus of claim 20, wherein the first network interface is further configured to support communication, based on the first communication protocol, from the apparatus to the remote device, of the identification information, wherein the identification information comprises at least one of an identifier of the remote device, a path in a file system of the remote device, or a file name.

22. The apparatus of claim 20,
  wherein the first network interface is further configured to receive the first token, at the apparatus from the remote device via a proxy server, utilizing the first communication protocol, in response to the communication for providing identification information of the source data,
  wherein the apparatus comprises, a decoder to decode, prior to the encoding, the first token received utilizing the first communication protocol,
  wherein the encoder is configured to encode the first token using a visual coding technique comprising a quick response (QR) coding,
  wherein the first token comprises other information for accessing the source data, wherein the other information comprises location of the source data, wherein a size of the first token and the other information included in the first token is less than a size of the source data, wherein the source data comprises more than one mega bytes,
  wherein the encoder is further configured to encode the first token at the apparatus.

23. The apparatus of claim 20, further comprising a security module configured to implement at least one of a first security measure and a second security measure, wherein the first security measure comprises:
    receiving information identifying at least one of the first device or a user of the device, in response to the first device attempting to access the source data; and
    communicating, an approval following validation of the received information by a user of the apparatus,
wherein the second security measure comprises:
    communicating, information identifying at least one of the first device or the user of the first device, to enable authentication of the first device or the user of the first device when the first device attempts to access the source data.

24. The apparatus of claim 20, wherein the first network interface is further configured to provide a request, directed to the remote device, to transmit the source data to a server comprising a cloud server and to send a second token to the apparatus, and wherein the encoder is further configured to encode the second token using the visual coding technique to generate a second visual tag and display of the second visual tag to enable the first device to access the source data transmitted to the server.

25. The apparatus of claim 24, wherein the first or the second token comprises a metadata comprising at least some of an identifier of the remote device, an identifier of the server, authentication information associated with the remote device, authentication information associate with the server, an identifier of the source data stored in the remote device, a path of the source data stored in the remote device, an identifier of the source data transmitted to the server, or a path of the source data transmitted to the server.

26. The apparatus of claim 20, wherein the first token is expirable and is a representation unique to one or more of the following: the source data, the first device, a user of the first device, and time related to creation or usage of the first token, and wherein the apparatus is configured to support a plurality of first devices, by receiving from the remote device a plurality of first tokens, and displaying a plurality of visual tags each visual tag of the plurality of visual tags encoding a first token of the plurality of first tokens and each token of the plurality of first tokens to enable one of the plurality of the first devices to access a respective visual tag of the plurality of visual tags and use the respective first token to access the source data, wherein each first token of the plurality of first tokens is a representation unique to one or more of the following: the source data, the one of the plurality of the first devices, a user of the one of the plurality of the first devices, and a time related to creation or usage of the token of the plurality of first tokens.

27. An apparatus for sharing source data, comprising:
    a processor operable to receive, by a first device, a first token associated with the source data;
    the processor operable to encode, by the first device, the first token to create a visual tag;
    the processor operable to communicate from the first device to a second device the visual tag, to enable the second device to access the source data utilizing the first token from the visual tag and utilizing a communication protocol; and
    the processor operable to communicate to the second device the visual tag to allow the second device to access the source data via a third device,
    wherein the first device supports communication between the first device and the third device to receive the first token from the third device or to enable the second device to access the source data,
    wherein the second device is unable to access the source data without using the first token, wherein the first device comprises the apparatus.

28. The apparatus of claim 27, wherein the processor is operable to identify the source data to initiate sharing of the source data.

29. The apparatus of claim 27, wherein the source data is stored in the first device, wherein the processor is operable to generate the first token associated with the source data stored on the first device.

30. The apparatus of claim 27, wherein the processor is operable to communicate to the second device, the visual tag, utilizing an electronic mail or a multimedia messaging service.

31. The apparatus of claim 27, wherein the processor is operable to encode the first token in a form of a uniform resource locator (URL) to allow the second device to access the source data via a website represented by the URL of the first token.

32. A method for sharing source data, comprising:
    identifying, at the first device, the source data for sharing;
    communicating based on a first communication protocol between a first device and a third device through a proxy server, wherein the communication is associated with identification information of the identified source data;
    receiving, by the first device, a first token associated with the source data;
    encoding, by the first device, the first token to create a visual tag using a visual encoding technique, wherein the visual tag comprises a quick response (QR) coded version of the first token;
    displaying the visual tag on the first device, to enable a second device to optically capture the visual tag utilizing a camera and to allow the second device to access the source data utilizing the first token from the visual tag and utilizing a second communication protocol, wherein the second device is unable to access the source data without using the first token,
    wherein the first communication protocol is the same or different from the second communication protocol,
    wherein the first device is a communication end point device.

33. The method of claim 32, comprising identifying the source data based on a user action at the first device.

34. The method of claim 32,
    wherein the communicating comprises communicating, to the third device, identification information of the source data, wherein the identification information comprises at least one of an identifier of the third device, a path in a file system of the third device, or a file name,
    wherein the communicating comprises communicating, to the third device, a request for the first token,
    wherein the receiving comprises receiving the first token in response to the request.

35. The method of claim 32, wherein the encoding the first token comprises encoding the first token using a visual encoding technique, wherein the visual tag comprises a quick response (QR) coded version of the first token, and further comprising notifying the second device when the first device is ready to display the visual tag to enable the second device to access the visual tag, wherein the notifying comprises sending a message to the second device.

36. The method of claim 32, wherein the method comprises at least one of a first security measure and a second security measure, wherein the first security measure comprises:
receiving information identifying at least one of the second device or a user of the second device, in response to the second device attempting to access the source data; and
communicating, an approval following validation of the received information by a user of the first device,
wherein the second security measure comprises:
communicating, information identifying at least one of the second device or the user of the second device, to enable authentication of the second device or the user of the second device when the second device attempts to access the source data.

37. The method of claim 32, wherein the method comprises:
transmitting the source data to a server comprising a cloud server and to send a second token to the first device;
encoding the second token to a second visual tag;
accessing the second visual tag by the second device to enable the second device to access the source data transmitted to the server using the second token.

38. The method of claim 32, wherein the source data comprises at least one of a media file, a document, remote path information, remote desktop connection information, security information, device management information, or device configuration information.

39. A method for sharing source data, the method comprising:
receiving, by a first device, a first token associated with the source data;
encoding, by the first device, the first token to create a visual tag;
communicating from the first device to a second device the visual tag, to enable the second device to access the source data via a third device utilizing the first token from the visual tag and utilizing a communication protocol, wherein the second device is unable to access the source data without using the first token,
wherein the first device supports communication between the first device and the third device to receive the first token from the third device or to enable the second device to access the source data.

40. The method of claim 39, wherein the method comprises identifying the source data to initiate sharing of the source data.

41. The method of claim 39, wherein the source data is stored in the first device, wherein the method comprises generating the first token associated with the source data stored on the first device.

42. The method of claim 39, wherein the communicating comprises communicating utilizing an electronic mail or a multimedia messaging service.

43. The method of claim 39, wherein the communication protocol to be utilized by the second device comprises at least one of a peer-to-peer protocol, an interactive connectivity establishment protocol, a session initiation protocol, a near field communication protocol, a bluetooth protocol, a wireless fidelity (WiFi) protocol, an extendable messaging and presence protocol (XMPP), a push protocol, or a non-industry standard communication protocol.

44. The method of claim 39, wherein the encoding the first token comprises encoding the first token in a form of a uniform resource locator (URL) to allow the second device to access the source data via a website represented by the URL of the first token.

* * * * *